US006973385B2

(12) United States Patent
Ulrich

(10) Patent No.: US 6,973,385 B2
(45) Date of Patent: Dec. 6, 2005

(54) SECURITY INTELLIGENCE TRACKING ANTI-TERRORIST SYSTEM

(76) Inventor: Henry B. Ulrich, 22 Oak Point Dr. North, Bayville, NY (US) 11709-1118

( * ) Notice: Subject to any disclaimer, the term of this patent is extended or adjusted under 35 U.S.C. 154(b) by 17 days.

(21) Appl. No.: 10/680,005

(22) Filed: Oct. 7, 2003

(65) Prior Publication Data

US 2005/0154527 A1 Jul. 14, 2005

Related U.S. Application Data

(60) Provisional application No. 60/416,795, filed on Oct. 8, 2002.

(51) Int. Cl.[7] ............................................ G01C 21/00
(52) U.S. Cl. ............... 701/207; 342/357.07; 340/572.1
(58) Field of Search ................. 701/207, 213; 342/357.07; 705/28; 340/10.1, 572.1, 572.3, 340/572.4, 572.8, 572.9

(56) References Cited

U.S. PATENT DOCUMENTS

| | | | |
|---|---|---|---|
| 5,615,247 A * | 3/1997 | Mills ........................... | 455/411 |
| 5,774,876 A | 6/1998 | Woolley et al. | |
| 6,600,418 B2 | 7/2003 | Francis et al. | |
| 2001/0035410 A1 * | 11/2001 | Taube et al. ................... | 220/1.5 |
| 2002/0089434 A1 * | 7/2002 | Ghazarian .................... | 340/988 |
| 2003/0160693 A1 * | 8/2003 | Hisano ................... | 340/539.13 |
| 2003/0160695 A1 * | 8/2003 | Hisano ................... | 340/539.13 |
| 2003/0164763 A1 * | 9/2003 | Hisano et al. .......... | 340/539.13 |
| 2004/0041706 A1 * | 3/2004 | Stratmoen et al. ...... | 340/539.26 |
| 2004/0066328 A1 * | 4/2004 | Galley et al. ............ | 342/357.1 |
| 2004/0108938 A1 * | 6/2004 | Entrekin .................... | 340/5.73 |
| 2004/0215532 A1 * | 10/2004 | Boman et al. ................. | 705/28 |

OTHER PUBLICATIONS

TYDENTEK, Cargo Security Technology, 2001 TydenTek, USA "The Data Seal (TM) Customs Processing Security System".

* cited by examiner

*Primary Examiner*—Gary Chin
(74) *Attorney, Agent, or Firm*—Amster, Rothstein & Ebenstein LLP

(57) ABSTRACT

The invention is a method and system for continuously tracking the movement of cargo in domestic and international shipping from point of departure to point of destination and to prevent hijacking of the same. The system uses one or more wireless electronic seals which can communicate with a central computer system, such as by satellite, providing the current location of the cargo at regular intervals or upon demand. The electronic seals are provided with a unique identification number and are activated upon locking of the seal to the closed cargo container. During shipment, the seal transmits its location to the central computer which compares the location of the shipment to a calculated expected route, notifying the parties to the shipment and government authorities in the event that the cargo is found to deviate from the expected route. The electronic seal is also capable of signaling the central computer when the cargo is opened. If the opening is premature, a second seal hidden within the cargo can be activated to enable tracking of the cargo. The system also provides a consolidated, verifiable record of the shipping history of a shipment which can facilitate government clearance and inspections of potentially dangerous cargo.

7 Claims, 21 Drawing Sheets

Overview Process Flows

Fig. 3A

*Screen to establish an Account*

```
                        'e2e Security Seals'

Login Please: Name      [                      ]
              Company   [                                      ]
              Address   [                                      ]
              Address   [                                      ]
              Country   [__] ▼  Postal Code: [           ]
              City Name [                       ]▼
Your Company's GVT ID [                   ]
Your Company's Type of Business [___]▼
Your Email Address: [                          ]
Your Telephone Nos: [                  ]
Enter the Password that you will use: [          ] There must be at least 3 letter & 2 numbers
Confirm the Password you entered here [          ]
You will be emailed your account within ten minutes.
```

Fig. 3B

*Screen To enter a password*

```
                        'e2e Security Seals'

Please enter your Company Assigned Account Code [            ]
                            Password:   [            ]
```

Fig. 3C

_Screen to order Seals_

```
                          'e2e Security Seals'

Welcome:  oooooo Contact Name    Tel oooooooooooooo email: ooooooooooooooooooo
          'ooooooooooCompany Name ooooooooooooooo
          'ooooooooo Address line 1    ooooooooooooo
          'ooooooooo Address Line 2    ooooooooooooo
          City Name      Postal Zone     Country: oo
─────────────────────────────────────────────────────────────────────────
SKU Code     Description of Seal                        Qty to Order

[          ]▼ooooooooooooooooooooooooooooooooooooo  [        ]

[          ]▼ooooooooooooooooooooooooooooooooooooo  [        ]

[          ]▼ooooooooooooooooooooooooooooooooooooo  [        ]

[          ]▼ooooooooooooooooooooooooooooooooooooo  [        ]

Are seals being shipped to your location [ ] ▼ If not, are they being shipped to a location that
was previously known to e2e security. [ ] ▼ If so then the system will show other ship to
points where stock has been shipped for your account. [_____] ▼
```

Fig. 3D

_Screen To establish a Ship To Address different than client_
This screen will appear if the user indicated that this is a new ship to not previously used by them.

```
                    'e2e Ship to information Screen
Login Ship to: Name      [                    ]
               Company   [                                          ]
               Address   [                                          ]
               Address   [                                          ]
               Country   [__] ▼  Postal Code: [             ]
               City Name [                        ]▼
Their Company's GVT ID [                    ]
Their Company's Type of Business  [___]▼
Their Email Address: [                                ]
Their Telephone Nos: [                    ]
```

Fig. 4

_Booking Screen_

| 'e2e Ship to information Screen |
|---|

| | | | | |
|---|---|---|---|---|
| Enter Seal Number: [             ] | | Container Owner Code [    ] ? | | |
| | | Nos. [        ] | | |
| Organization ID Code: [           ] | | | | |
| Carrier ID Code: [           ] ? | Origin Ctry [  ] ? | Postal Zone [          ]? | | |
| Intermediary Location or Consolidation Point | [  ] ? | Postal Zone [          ]? | | |
| Shipper ID [           ] | Reference: [          ] | | | |
| Consignee ID [           ] | Reference: [          ] | | | |
| Freight Forw [           ] | Reference: [          ] | | | |
| Foreign Brkr. [           ] | Reference: [          ] | | | |
| Booking No. [           ] | | | | |
| Known B/L# [           ] | | | | |

| Vessel Name/Airline Code | Carrier Code | Departs On | Vyge/Flt.No. | Origin | Destination |
|---|---|---|---|---|---|
| [        ] | [      ] | [      ] | [      ] | [      ] | [      ] |
| [        ] | [      ] | [      ] | [      ] | [      ] | [      ] |
| [        ] | [      ] | [      ] | [      ] | [      ] | [      ] |

| Parties | Origin Departure | Intl Carrier | Transfer Vsl/Airline | Cross Border | Arrival Des City | Customs Clearance | Arrival Consignee | Diversions From Plan |
|---|---|---|---|---|---|---|---|---|
| Shipper [ ]? | [ ]? | [ ]? | [ ]? | [ ]? | [ ]? | [ ]? | [ ]? | [ ]? |
| Consignee [ ]? | [ ]? | [ ]? | [ ]? | [ ]? | [ ]? | [ ]? | [ ]? | [ ]? |
| Intl. Carrier | [ ]? | [ ]? | [ ]? | [ ]? | [ ]? | [ ]? | [ ]? | [ ]? |
| Origin Carrier [     ] | [ ]? | [ ]? | [ ]? | [ ]? | [ ]? | [ ]? | [ ]? | [ ]? |
| Destn Carrier [     ] | [ ]? | [ ]? | [ ]? | [ ]? | [ ]? | [ ]? | [ ]? | [ ]? |
| Destn Customs [ ]? | [ ]? | [ ]? | [ ]? | [ ]? | [ ]? | [ ]? | [ ]? | [ ]? |
| Origin Customs[ ]? | [ ]? | [ ]? | [ ]? | [ ]? | [ ]? | [ ]? | [ ]? | [ ]? |

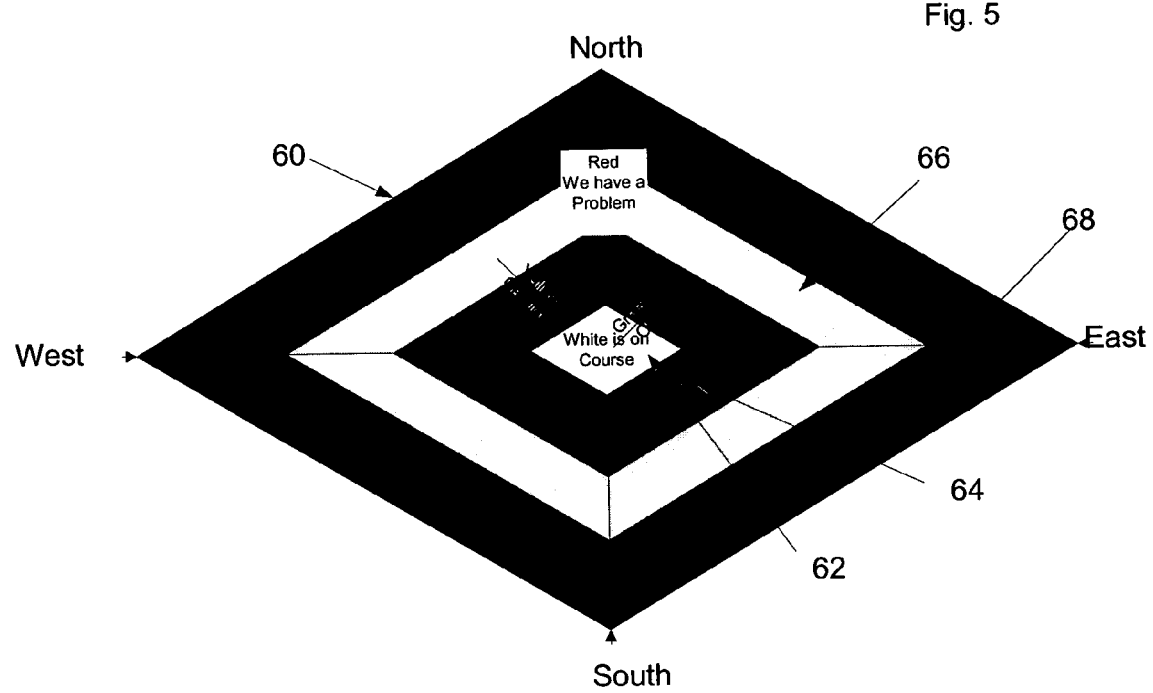

Fig. 6a

_Screen To enter Customs Clearance Authority_

```
                    'e2e Security Customs Clearance'

Please enter your Company Assigned Account Code [_____]
                         Password:    [_____]

Shipment can be identified with one of the following references. You need to enter at least one
reference:
            'e2e seal number       [_____]
            'Container Number      [____] [_____]
            Brokers reference      [_____]
            Shippers Reference     [_____]
            Importers Reference    [_____]
```

Fig. 6b

_Screen to enter detail Customs Clearance_

```
                    'e2e Security Customs Clearance'

Welcome! 'ooooooooo Contact Name oooooooooo'
         'oooooooooo   Company Name     ooooooooooo'
         'oooooooooo   Company Address  ooooooooooo'
         'oooooooooo   Company Address  ooooooooooo'
         'oooooooooo   Company City etc ooooooooooo'

Seal No. ooooooooooooooo       Your ref: oooooooooooooooooooo
Container No.: oooo ooooooo    Bill of Lading: oooooooooooooooooooo
Arrived at: ooooooooooooooooooo on DD MMM CCYY
Carrier/Vessel: ooooooooooooooooooooo From: ooooo Origin ooooooooo Please enter the following information as appropriate for this shipment:
Import Customs Reference: [_____]
Type of Clearance Given:  [____] ?
Date and Time Cleared     [_____]
```

Fig. 7A

*Screen To enter Container Interchange Authority*

```
'e2e Security Container Interchange

Please enter your Company Assigned Account Code [_____]
                       Password:     [_____]

Shipment can be identified with one of the following references. You need to enter at least one
reference:
           'Container Number   [____] [_____]
```

Fig. 7B

*Screen for Container Inter-Change Data*

```
                 'e2e Security Container Interchange

Welcome! 'oooooooo Contact Name ooooooooo'
         'ooooooooo   Company Name    ooooooooooo'
         'ooooooooo   Company Address  ooooooooooo'
         'ooooooooo   Company Address  ooooooooooo'
         'ooooooooo   Company City etc ooooooooooo'
Seal No. ooooooooooooooo     Your ref: [_____]
Container No.: oooo ooooooo  Location of Interchange [_____]
Arrived at: oooooooooooooooooooo on DD MMM CCYY
Carrier/Vessel: ooooooooooooooooooooo From: ooooo Origin ooooooooo
Transferred To: [_____]  Destined For: [_____]?
Voyage/Flt./Trip [_____] Departing [_____] Arriving [_____]
Please enter the following information as appropriate for this shipment:
Carrier Receiving the Container: [_____]
```

Screen to enter details of damage                                      Fig. 7C

'e2e Security Container Interchange

Container Condition Code: [ __ ] ?   ooooooooooooooooooooooooooooooooooo
Date and Time Exchanged   [ _ ] Yr  Month [ __ ]  Day [  ]    Time: [ ____ ]

Container has six walls that need to be checked for damage. For purposes of Identification of the walls we will number them and damage will be reported based on the assigned number.

| Section of the Container | Image | Comments |
|---|---|---|
| Tail Gate | | [_____]<br>[_____]<br>[_____]<br>[_____] |
| Top of Container | | [_____]<br>[_____]<br>[_____]<br>[_____] |
| Right Side Looking from Back to Front | | [_____]<br>[_____]<br>[_____]<br>[_____] |
| Left Side Looking from Back to Front | | [_____]<br>[_____]<br>[_____]<br>[_____] |
| Front of Container | | [_____]<br>[_____]<br>[_____]<br>[_____] |
| Bottom of Container | | [_____]<br>[_____]<br>[_____]<br>[_____] |

Driver Transfer Information
License Plate Number of the Chassis or Truck : [_____] ?
License information on Driver:  Surname: [_____]  First [_____]
License issued by : [_____]?  License No. [_____]  Expires [_____]
Truckers Delivery Order No or Authorization Ref: [_____]

Fig. 8

*Screen to enter delivery information*

```
                          'e2e Security Delivery

Please enter your Company Assigned Account Code [_____]
                          Password:     [_____]

Shipment can be identified with one of the following references. You need to enter at least one
reference:
            'e2e seal number      [_____]
            'Container Number     [____][____]
            Truckers reference    [_____]
            Shippers Reference    [_____]
            Importers Reference   [_____]
            Brokers Reference     [_____]
            Actual Date and Time of Arrival: [_____] [____]
```

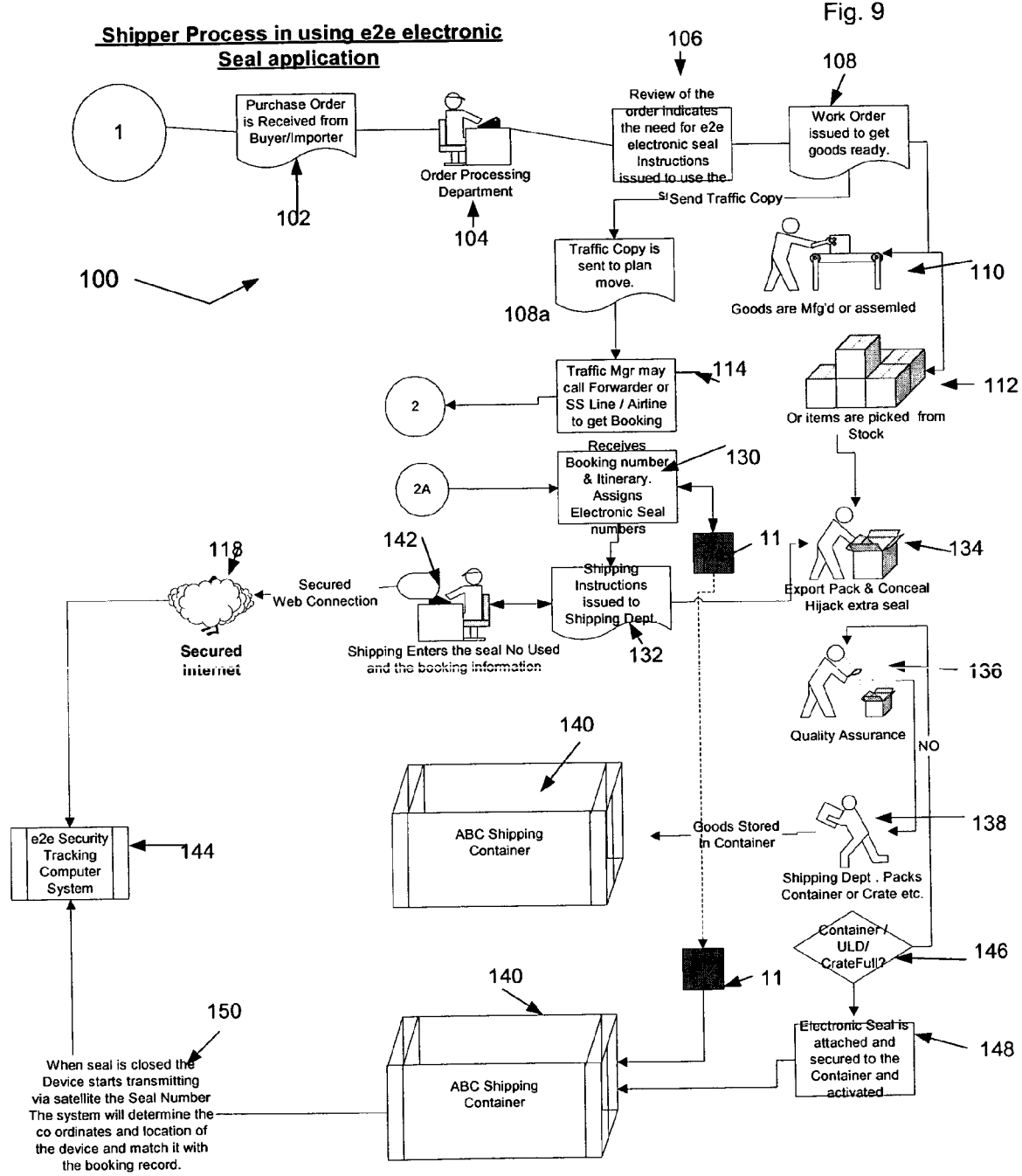

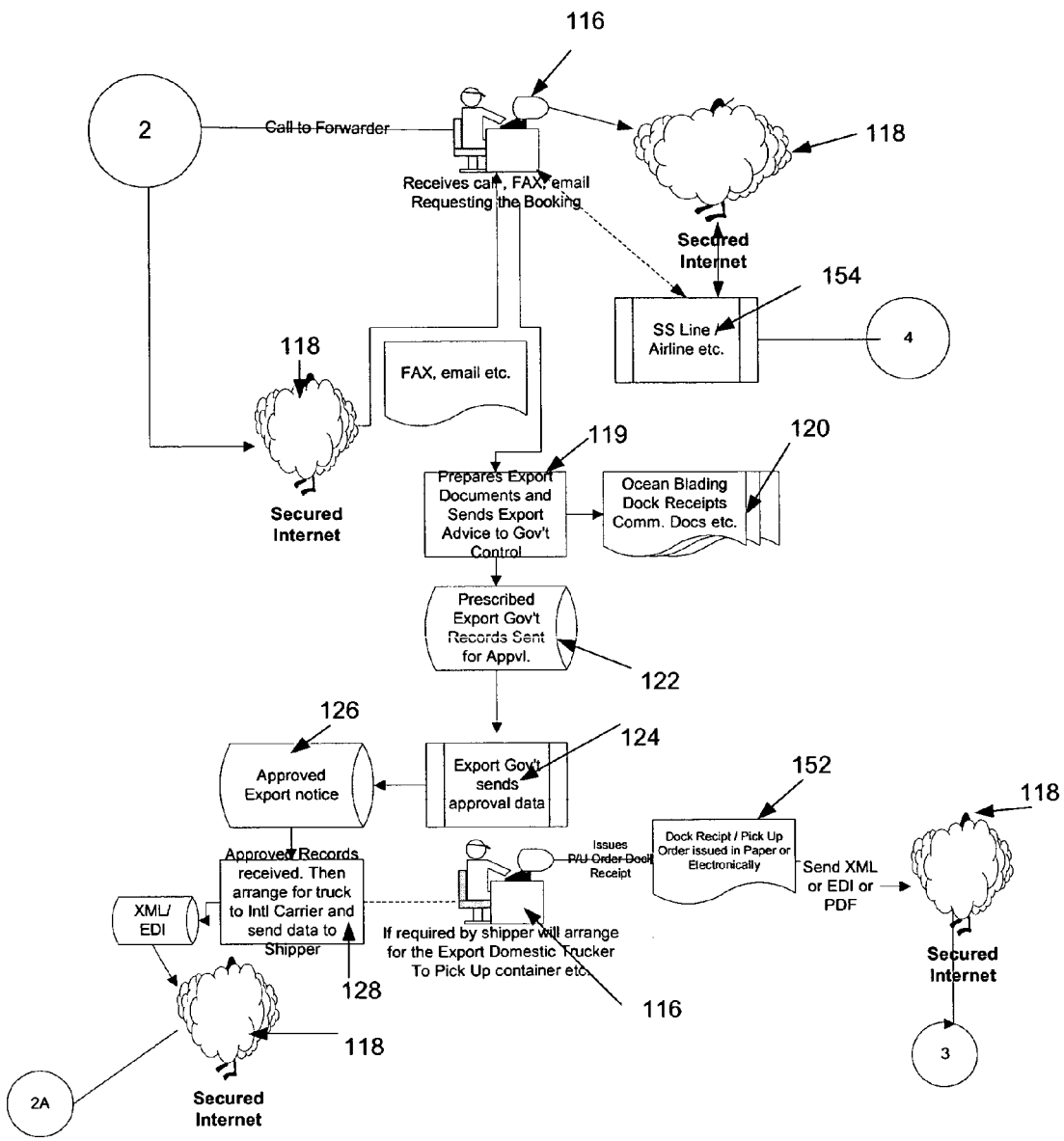
Fig. 10 — Freight Forwarder Process using e2e electronic seal

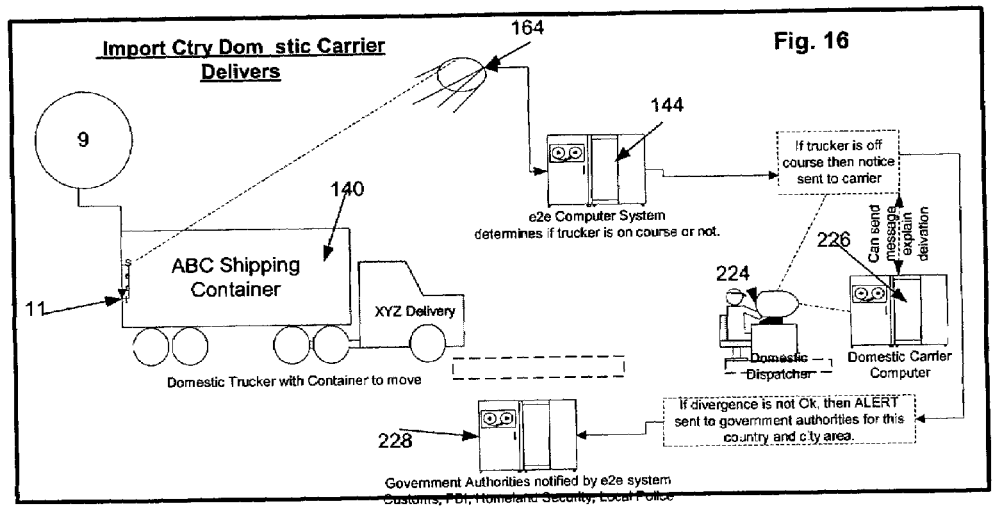
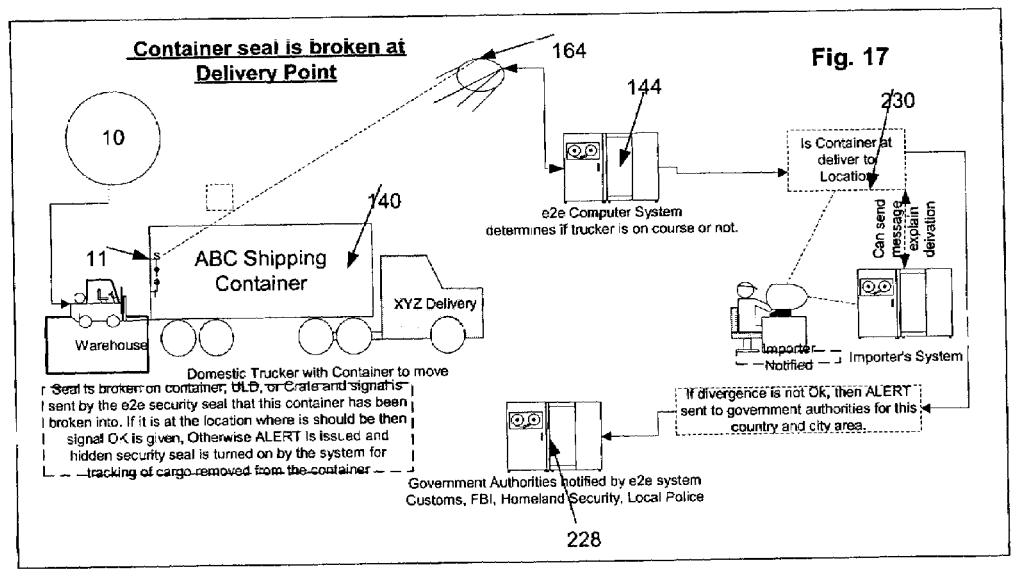

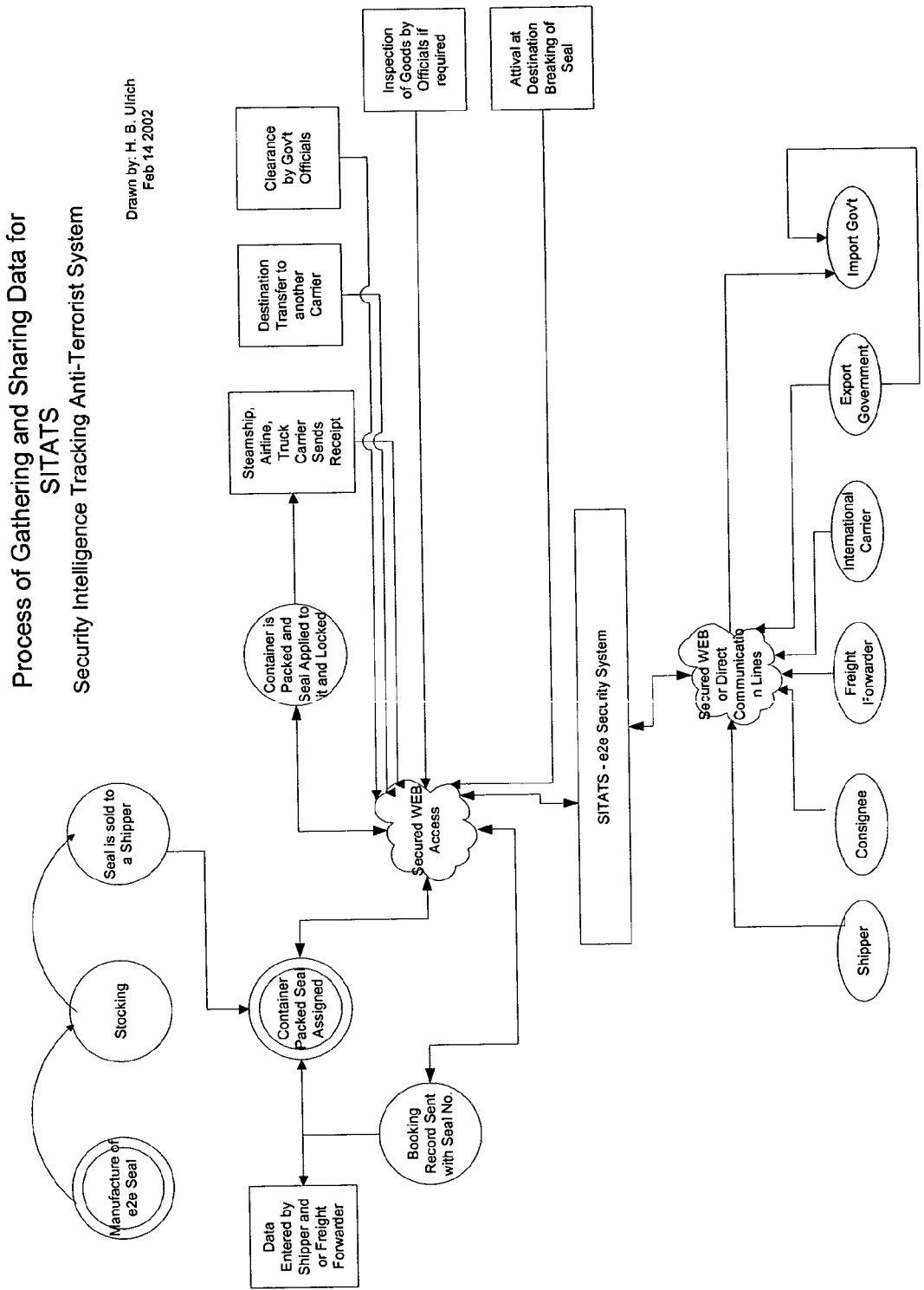

SECURITY INTELLIGENCE TRACKING ANTI-TERRORIST SYSTEM

RELATED APPLICATIONS

The present application claims priority to a provisional application filed in the U.S. Patent and Trademark Office on Oct. 8, 2002 with Ser. No. 60/416,795. The contents of the provisional application are hereby incorporated by reference.

BACKGROUND OF THE INVENTION

This invention relates to deterrents to terrorism in international shipping. Specifically, the present invention relates to a system and method for determining the end-to-end routing of a shipment from the door of a shipper to the door of a consignee.

FIG. 1 is an overview of the steps in a typical shipping process. Typically, the shipping process begins at Step 1 when the entity or person who is responsible for the initiation of a shipment, known herein as the shipper, loads a container with cargo and seals it. This is currently done with a device such as a tamper-evident lead seal.

In the Step 2, a firm which specializes in arranging transportation and the necessary documentation for export and domestic movements of cargo, known herein as a freight forwarder, obtains a booking record from the shipper. The booking information contained on the record includes a list of the parties to the shipping transaction (e.g. the shipper and the entity or person designated as the recipient of the shipment, identified herein as the consignee) along with the itinerary of the shipment and whether it is an international or domestic shipment.

In Step 3, a firm responsible for moving cargo from one point to another within a country, referred to herein as a domestic carrier, transports the container to the place where the cargo can be loaded onto a vessel, aircraft or other form of international transportation. This location is known as the port of loading. At the port of loading, the domestic carrier typically tenders the container to a steam ship line or airline which will serve as the international carrier.

In Step 4, the international carrier provides a bill of lading and cargo manifest for all bills of lading to government authorities. A bill of lading is a document that is used by international carriers to describe cargo being shipped between two designated points. This can be an inland bill covering domestic moves, an air waybill or similar documentation.

In Step 5, a customs broker makes an import entry. A customs broker is a firm that is licensed by the importing country to issue a customs declaration form that declares the nature of the goods and typically the duties and taxes owed thereon. A customs broker will also arrange for the movement of the goods from the port of entry to the final consignee.

In Step 6, the exporting government may, at its option, review documentation relating to the shipment and pass information to the importing customs authority.

In Step 7, the customs broker or an importer assigns the shipment to a domestic trucker.

In Step 8, the importing customs authority decides whether to inspect the cargo. If inspection is called for, the seal installed in Step 1 is broken and a new seal is installed on the authority of importing customs.

In Step 9, the domestic trucker delivers the shipment to the consignee. If the shipment is successful, the seal installed in Step 1, or its replacement installed in Step 8 of the shipping process is broken in Step 10 by the consignee who receives and inspects the cargo.

An enormous quantity of cargo departs and arrives from international ports worldwide on a daily basis, however only a small percentage of the cargo can be inspected as a practical matter. Therefore, unless carefully monitored at every step, the shipping process introduces a risk to national security, particularly from terrorism.

Current asset management systems attempt to monitor the existence, location and status of items being transported or stored. Such a system is disclosed in U.S. Pat. No. 5,774,876 to Woolley, et al.

Woolley discloses an asset management system in which uniquely identifiable asset tags are attached to individual shipments. The tags are capable of storing unique identification information as well as data regarding a shipment's origin and destination as well as a signature of the owner of the shipment. The tags are capable of detecting their location and transmitting this information to a remote location for purposes of tracking a shipment en route.

An asset management system such as that disclosed by Woolley provides a workable approach to tracking cargo and preventing tampering therewith while in transit. However, the data provided by such systems is insufficient and is not organized in a manner conducive to the prevention of terrorism. Specifically, although the present technology has been applied for tracking, theft management and tamper prevention, these functions have not been effectively integrated and the obtainable data has not been distributable such that oversight of a shipment can be maintained from shipper to consignee without interruption. This problem applies particularly to international shipments, especially those which take place on the high seas, or across multiple national borders before reaching their destination.

Therefore, a need exists for a system which can continuously monitor multiple aspects of the status of a shipment that can be integrated with current shipping processes "door to door" from shipper to consignee across multiple international borders, and in international waters and air space.

A further need exists for a system which will provide international carriers and national governments with accurate information regarding the location and contents of shipments in transit to assist government authorities to determine if cargo should be inspected.

A further need exists for a cargo tracking system which generates an efficient routing guide based upon the origin and destinations of the shipment to allow the system to notify authorities of any deviation from logical routes.

SUMMARY OF THE INVENTION

In general, the invention features a system and method to determine the end-to-end routing of a shipment from the door of a shipper to the door of the consignee to act as a deterrent to terrorism in international shipping. The system combines existing satellite and communications technology with application software which securely passes data, preferably in an acceptable encryption format, to government agencies responsible for reducing terrorism. The information and physical tracking of the cargo is accomplished through an electronic seal that ideally emits several types of signals along with the seal number. Those signals are received by the e2e system using known communication technology and is stored in a computer database for processing.

A preferred embodiment of the system of the present invention (the e2e system) also provides an e2e security seal which uses information from the shipper. The shipper enters the origin and destination along with identifying data of the seal number and the name and location of the consignee, which can be used to determine if the consignee is on a denied party list published by the U.S. State Department and Customs which is now part of the Homeland Security Department. To the extent that other countries have similar denied party lists, those may also be maintained within the e2e system. The information entered by the shipper provides both export and import governments with more intelligence on actual products being shipped. This information can be used in the transfer records to the government to provide intelligence for inspection and classification of goods.

The e2e system provides a means to identify domestic truck drivers by license ID and by a computer image of the driver kept in the system entered by the carrier as well as a digital image of the driver. The digital image is an option to be used in high-risk cargo, where the shipper needs to know the identity of the driver before turning over the cargo to the driver. Participating domestic carriers would use the e2e system to send a prescribed record found in this document that identifies the driver and the file name associated with the driver. In addition, the e2e system will track and control interchanges which will benefit domestic carriers. The purpose of interchange tracking is to record the transfer of responsibility for the container and to record any damages to the container during such transfer. The interchange record is a significant benefit to carriers, container owners (leasing companies), and insurance companies for establishing the condition of containers and who was responsible.

The e2e seal system provides international carriers with information not commonly available to them today. A booking request will provide them with information to assist them in the preparation of the bills of lading and with the manifest data that is essential to customs in the U.S. and other nations. They will participate in the benefits of the interchange record as well. The system facilitates the clearance of containers and thereby facilitates the movement of containers through container yards. Those steamship lines not having sophisticated systems to track of vessels can also take advantage of the e2e system in tracking of the vessels by the e2e sealed cargo they may carry.

The present invention also provides for the transfer of containers from one vessel to another vessel or from one mode of transportation to another. The ability to account for this type of transfer is essential to a true door-to-door tracking system.

The system of the present invention provides links to export and import government authorities. The information provided through booking and routing guides will provide intelligence to those agencies required to protect against terrorism. The information supplied further enhances the intelligence used by government authorities to determine if cargo should be inspected.

According to an embodiment of the present invention, a second e2e security seal can be placed in an undisclosed location within a shipment to locate hijacked cargo if the e2e security seal on the outside of the container is removed. A signal from the e2e security seal upon breach would preferably turn on the second seal when the outside seal is opened and the cargo is not located at the final destination. In a modified embodiment, an authorized pre-delivery opening of the cargo (as for customs inspection or for another legitimate purpose) would prevent the outside e2e security seal from activating the inner seal. Specifically, the second seal receives a hijack signal from the first seal when the first seal is broken. The second seal will allow a satellite to locate the second seal and give the coordinates to government to authorities to locate the cargo, even if the first seal is disabled or no longer located with the cargo.

A routing guide is preferably generated based on the latitude and longitude of all known ports, cities, towns, and postal codes. Specific shippers and importers will have their locations stored in their respective files and be used to generate a logical routing. This table is maintained by the system of the present invention and indicates what port of exit should be used or recommended for use when making a shipment from a given location to another country and city within that country. The user is allowed to indicate specific ports, but the system will provide a logical selection and indicate to the government when that logical choice is not made.

In a further embodiment of the present invention, carrier and driver ID is maintained in the system. This is accomplished by using standard international code identification of carriers. Drivers will be coupled with the carrier, and then the state or province issuing the license, along with that identity's unique identification. To ensure that the proper driver shows up to pick up the cargo, an image file of the driver is provided in addition to the driver's license number. This image is ideally accessible to the receiving clerk or the shipper to ensure that the correct driver has delivered the goods.

In a further embodiment, each locale keeps a file as to which parties should be notified in the case of an emergency. These parties will be notified in the order they are listed.

An exemplary summary of the components of an embodiment of the present invention are provided in Table 1, below. As described in greater detail in the description of the preferred embodiments below, each of the steps of the process provided in Chart 1 can be dovetailed into the existing shipping process as described above, and are sufficiently flexible to accommodate future shipping methodologies.

TABLE 1

| Step No. | Description of Step & Method of Input | Process Controlled here | Responsible Party |
|---|---|---|---|
| 1 | Manufacturing step of Seal number Manufacturing process step will assign unique number to memory chip in the device. | Unique number assigned to the seal. This will be a 15 alpha/numeric code wherein the device will transmit this seal number to the satellite when triggered in step No. 1 described in FIG. 1.1 | 'e2e security or their approved/licensed agent manufacturing the device. |
| 2 | Purchase of Seals. Input done via secured WEB | A program will record who is buying the seals and when | 'e2e security or their approved/licensed |

TABLE 1-continued

| Step No. | Description of Step & Method of Input | Process Controlled here | Responsible Party |
| --- | --- | --- | --- |
| | input or direct input by e2e security. | that company is licensed authorized re-seller of the seal. The program will set up a data base that will record how many seals were purchased and will draw down from that number as each seal is employed in screens to order seals depicted in this document several pages below. | agent distributor of the device. It is envisioned that Forwarders and Consolidators will use the device |
| 3 | Booking information. Input done via secured WEB input or direct input by e2e security. | Recording of Parties to the transaction along with the itinerary of the shipment whether it is international or domestic moves. This process is depicted in FIGS. 1.2 The data also includes the exact location of the Shipper and the Importer. | Shipper, Freight Forwarder or Carrier if step not accomplished by either the Shipper or Forwarder. |
| 4 | Closure of the Container. Input done via secured satellite transmission by the e2e security seal. | When a seal is closed (See device diagrams) the seal will activate the transmitter and send the first of four types of messages. This message will be that shipment has started. See FIG. 1.1 | Shipper, Consolidator, Forwarder or government agent is activated by them but controlled by e2e security. |
| 5 | In-transit movement Input done via secured satellite transmission by the e2e security seal. This would employ a wireless data systems, GEOSAT systems (geo synchronous satellite), or LEOSAT/MEOSAT (Low Earth orbit satellite/Medium Earth Orbit Satellite). The use of the satellite service will be based on the most available service. | Based on the model of the seal the program will send a read message to the satellite provider for a coordinates position of the e2e seal. | 'e2e Security' |
| 6 | Arrival at Country of destination for International shipments. Input done via secured satellite transmission by the e2e security seal. The entry to a country will be considered at least the international borders but can be extended up to 100 miles or more of the border based on the requirement of the government officials of that country. | This process will setup co-ordinates of planned first port of call in any given country where the shipment crosses a border. This will send a message to participating country Border Security Authorities that this shipment has crossed that border. The data given to the authority would include Shipper and Consignee information along with Port of Entry data. It is anticipated that certain countries may require this information for expedited clearance. | 'e2e Security' |
| 7 | Arrival at City of destination for all shipments. Input done via secured satellite transmission by the e2e security seal | When the seal is sending a signal that is interpreted that it has arrived at the city of Destination, then a process will be triggered that will advise the status to those designated in step 3 above | 'e2e Security' |
| 8 | Import Clearance Input done via secured message or WEB access from participating governments, Importer or Customs Brokers | This optional step for international shipments will indicate the equivalent of clearance messages from participating Import Countries where an electronic message will be sent to indicate clearance of | Input would be done by authorized government agencies through several methods: EDI secured WEB secured Other secured |

TABLE 1-continued

| Step No. | Description of Step & Method of Input | Process Controlled here | Responsible Party |
|---|---|---|---|
| | | inspection of the goods. If an inspection record is received then the e2e system will anticipate that the container seal will be broken before receipt at the consignee. If the goods are moved to a non-designated area before clearance is received from the government, then a message will be sent to government officials participating in e2e security chain. | transmission of data. |
| 9 | Transfer of Carrier Input done via secured message from participating carriers or brokers | There may be a need to record that a container is being transshipped via another carrier for either an international or a domestic leg of the journey. In addition, this process would ID the person authorized to deliver goods to the consignee where possible. | Carrier who transfers the goods to another carrier. This should be done as part of the inspection of the outside of the container to assure that the container is the in good working order. Container stations therefore will be doing this for shipments that are being delivered to final destinations. International carriers will be doing this for transshipments where the cargo is moved from one vessel to another or is taken from one flight to another. 'e2e Security' |
| 10 | Arrival at Consignee Input is automatic based on the fact that the seal is broken and the Latitude and longitude is equal to the final destination co-ordinates that were defined at the time of the Booking establishment. Hijacked find information would be input via secured WEB input by authorized government agency or importer of the goods. | The e2e seal will send a distinct message that the seal is broken. That message will then be compared to the co-ordinates of where it was expected to be delivered and if there is a deviation a message will be sent to authorities indicating that deviation and the current location of the seal even if it is not on the box. A second seal could have been hidden in the container or within the cargo if the shipper or consignee is trying to detect the locations of the goods today. The system will be associated with the hidden seal number in the application and will activate this seal as soon as the first seal is broken at a destination different than the scheduled final destination and not authorized by inspection by government agency. The "hidden Seal" will send out a message for authorities on a continual basis until the cargo, not the container is located and an authorized find signal is received by the SITATS system | 'e2e Security' |

Other features and advantages of the invention will become apparent from the following description and claims.

BRIEF DESCRIPTION OF THE DRAWINGS

FIGS. 3A through 3D are exemplary computer interfaces to facilitate order entry in the system of the present invention.

FIG. 4 is an exemplary computer interface to facilitate entry of booking information in the system of the present invention.

FIG. 5 is a schematic representation of error levels generated during transit in the system of the present invention.

FIGS. 6A and 6B are exemplary computer interfaces to facilitate entry of customs clearance information in the system of the present invention.

FIGS. 7A through 7C are exemplary computer interfaces to facilitate cargo interchange data into the system of the present invention.

FIG. 8 is an exemplary computer interface to facilitate entry of delivery information in the system of the present invention.

FIG. 9 is a process flow diagram of an exemplary process followed by a shipper integrating the system of the present invention.

FIG. 10 is a process flow diagram of an exemplary process implemented by a freight forwarder integrating the system of the present invention.

FIG. 16 is a process flow diagram of a process implemented by a domestic carrier integrating the system of the present invention.

FIG. 17 is a process flow diagram implemented by the consignee upon receipt of a shipment integrating the system of the present invention.

FIG. 18 is a process flow diagram illustrating the process of gathering and sharing data in the system of the present invention.

DESCRIPTION OF THE PREFERRED EMBODIMENTS

As discussed above, the present invention is implemented on a computer network that receives and transmits data over existing communications infrastructure such as the internet satellite systems for GPS (Global Positioning System) which provide a signal for the exact longitude and latitude received by and e2e security seal transmission devices as described herein below. The system of the present invention uses input received from one or a plurality of e2e security seals in addition to web/internet encrypted input from users of the system such as shippers and government agencies who initiate and/or employ a cargo booking record. As used herein below, booking is the process in which a company or individual reserves space for transport on a vessel, airline, truck or rail to move goods.

Figure 2A:
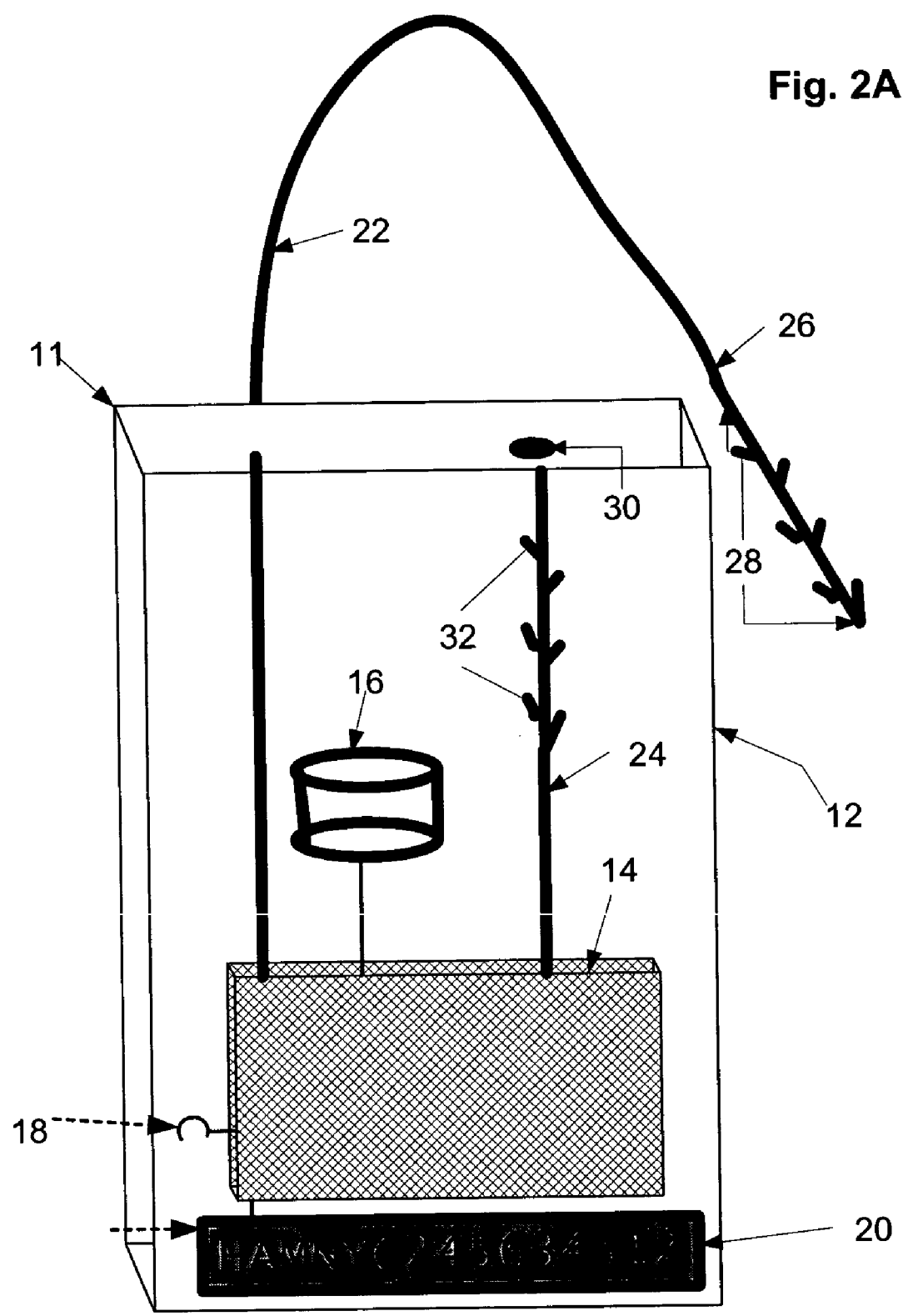
FIG. 2A is a schematic diagram of an e2e security seal prior to locking.

As shown in FIG. 2A, e2e security seal 11 is shown having a housing 12 which contains a transmitter/receiver 14 which is connected to battery cell 16, display button 18 and electronic seal display 20. Transmitter/receiver 14 has a memory (not shown) which stores an identification number which can be displayed on electronic seal display 20 by actuation of display button 18 by user.

Housing 12 can be of any size appropriate for containing the internal components of the e2e security seal. The e2e security seal is analogous to the lead seals currently used in international shipping, so the dimensions of housing 12 are ideally between 2.5×4×0.25 inches and 3×6×0.5 inches.

Ideally, the identification number is assigned during manufacture of the e2e security seal. The number is preferably unique to the seal and may be based upon an algorithm unique to the manufacturing location of the e2e security seal. For example, the identification number of seals manufactured in New York maybe based upon the output from a first algorithm, whereas seals manufactured in Colorado may be based upon second algorithm, provided that the results of the first and second algorithm do not result in the assignment of the same identification number to more than one e2e security seal. To maintain the integrity of the system of the present invention and to prevent the manufacture of counterfeit seals the algorithms used by the manufacturers should remain secret, and known only to limited authorized personnel.

The use of location specific algorithms allows the system of the present invention to identify the manufacture and the century year and month of manufacture of any seal employed in the system. Likewise, this will assure that the e2e security seals in service are genuine, and that counterfeits can be detected.

Referring again to FIG. 2A, transmitter/receiver 14 is also connected to flex cable 22 and female cable end 24. Flex cable 22 and cable end 24 are ideally lengths of fiberoptic cable. The cable is ideally surrounded by stainless steel or similar wire mesh that is further encased in a weatherproof coating. Additional weatherproofing could be provided by an umbrella-like cap (not shown) which covers the insertion points of the cable 22 into housing 12. Flex cable 22 extends outside housing 12 and terminates at a locking cable end 26 which has a keyed surface 28 which may be protrusions formed integrally with flex cable 22.

Likewise cable end 24 terminates in receptacle end 30 which has apertures 32 which are ideally keyed to match protrusions 28 in flex cable 22.

Transmitter/receiver 14, in addition to storing a unique identification number must be able to send a signal sufficient to be read by existing wireless communication systems. Additionally, it must have the ability to ascertain its location, as from the existing GPS satellite system. It should also have a range of wireless transmission/reception capabilities which allow the e2e seal's memory to be queried securely from a remote location.

Among the types of signals transmitter/receiver 14 should be able to transmit are a signal that indicates that the seal has just been closed. The closure signal starts the e2e system's cargo tracking. After the closure signal, a signal indicating movement during a domestic routing is transmitted. This signal is ideally transmitted frequently and should occur immediately after goods are sealed at the shipper's location and upon arrival at the port of discharge. Then, a signal indicating international leg movement routing is ideally transmitted. The signal may be less frequent and will be triggered based upon the notification of receipt of the shipment by the steamship line, or airline. The timing of the transmissions is optional and reduces the overall energy requirements to send a signal to a satellite while the goods are in transit over the ocean. The more frequent domestic routing signal would again be initiated when the cargo is within 25 miles of the international destination.

Then a signal indicating the seal is broken at the destination location is transmitted. This transmission indicates a successfully completed shipment. Alternatively, a signal indicating the seal is broken at a location other than the expected destination can be transmitted. This will cause an alert message to be sent to government officials using the system in the local country along with the domestic, importer and international carriers. This signal can also cause a second device hidden within the cargo to emit a signal that will initiate a tracking and recovery signal to allow tracking and recovery of potentially stolen goods.

Dependent upon the application for which the e2e security seal will be employed, a person of skill in the art would be able to select from the wide existing range of communication technology available to provide the wireless functionality of transmitter/receiver 14 described above.

Furthermore, in addition to having sufficient memory to store an identification number, the memory of transmitter/receiver 14 can ideally store values for a number of data fields which are set forth below in Table 2. Or optionally, a data file updated on a centralized computer system, such as the e2e system, used to monitor the movement of a container. As described in greater detail below, these fields enable the e2e security seal to respond properly to events that occur to the seal during shipment.

TABLE 2

File Name- e2e Seal number file

| Data Field | Appx Size | Description | Other File Relationship | Data Element Connecting it |
|---|---|---|---|---|
| E2e_seal_no | 15 | Unique code assigned to this device | | |
| E2e_Supplier | 20 | Name of the authorized Manufacturer | Party File | Party_Code |
| E2e_SKU | 12 | SKU ID code of seal | E2e SKU | SKU_Code |
| E2e_Seal_Mfg_Date | 8 | Date this unit was Manufactured | | |
| E2e_Sold_Date | 8 | Date this unit was sold | | |
| E2e_SoldTo | 20 | Code of entity unit sold to. | Party File | Party_Code |
| E2e_ActDateTime | 14 | CCYYMMDDHHmmSS CC—Century, YY—Year, MM_Month DD—Day, HH—Hour, mm—Minute, SS—Second | | |
| E2e-Lattitude_start | 10 | Latitude Position at the beginning of journey | | |
| E2e-Longitude_Start | 10 | Position at the beginning of journey | | |
| E2e-Lattitude_end | 10 | Latitude Position at the end of journey | | |
| E2e-Longitude_end | 10 | Position at the end of journey | | |

The next step in the system of the present invention is the purchase of an e2e security seal by a shipper. Throughout the shipping process, the application of the e2e system depends upon strict tracking of the location of all e2e security seals. Thus, a database should be created, preferably on a computer system providing access to the internet, which will track the particulars of each seal sold with a valid identification number.

Table 3 provides a preferred list of data fields and their specifications for the creation of an e2e database to track information related to the sale of e2e security seals to authorized personnel in the shipping industry. Such authorized personnel may be considered "distributors" of the e2e seal and will be recorded in the database.

TABLE 3

| Data Field | Appx Size | Description | Other File Relationship | Data Element Connecting it |
|---|---|---|---|---|
| Party_Code | 20 | Unique Code assigned by System to Seller | None | |
| Party_Type | 1 | M = Manufacturer, S = Seller, U = User | SIC file | SIC_CODE |
| Party_SIC | 3 | Classification of the Seller SIC Code | SIC file | SIC_CODE |
| Party_Name | 40 | Name of the Party | | |
| Party_ADR1 | 40 | Physical Location of the Party | | |
| Party_ADR2 | 40 | Physical Additional Address Line | | |
| Party_Crty | 2 | ISO Country Code of Party | ISO Ctry | ISO_CODE |
| Party_CITY | 25 | Name of the City | | |
| Party_Postal | 16 | Postal Zone within the Country | ISO POSTAL | ISO_CODE & ISO_ZONE |
| Party_Date_CR | 8 | CCYYMMDD Century, Year, Month and Day of record being established. | | |
| Party_Date_Last | 8 | CCYYMMDD for the last Transaction | | |
| Party_Qty2Dte | 9 | Cumulative Count since starting of activity. | | |
| Party_QtyCur | 9 | Current year totals | | |
| Party-contact | 30 | Name of contact at seller | | |
| Party-phone | 18 | Telephone Number of Office | | |
| Party-email | 32 | Email Address of Seller | | |
| Party-Shrt-Name | 20 | Short name of seller for reports | | |
| Party_Local_Gvt# | 20 | ID of the Seller's entity as form of "Known Seller" information | ISO Govt# | ISOGVTCTRY ISOGVTID |
| Party_Invty | 1 | Method to use to balance inventory D = Daily, W = Weekly, M = Monthly and A = Annually. | | |

File Name- ISO Country

| Data Field | Appx Size | Description | Other File Relationship | Data Element Connecting it |
|---|---|---|---|---|
| ISO_CODE | 2 | International Standards Organization code for countries | | |
| ISO_CtryName | 25 | Country Name | | |
| ISO_Continent | 1 | Continent where country exists | World | World_ContCode |
| ISO_Ctry_Def_Email | 32 | Email Address of Person to be contacted with Terrorist Notice | | |
| ISO_Phone# | 18 | Phone number of Hot line for such notices | | |
| ISO_Friendly_Rate | 6 | Classification code of probability that Terrorist could exist within the borders of this country | | |
| ISO_Contact1 | 30 | Name of the contact | | |
| ISO_Contact1_Title | 12 | Title of the contact | | |
| ISO_Contact1_Phone | 18 | Phone number | | |
| ISO_Contact1_email | 32 | Email Address | | |
| ISO_Contact2 | 30 | Name of the second contact | | |
| ISO_Contact2_Title | 12 | Title of the contact | | |
| ISO_Contact2_Phone | 18 | Phone number | | |
| ISO_Contact2_email | 32 | Email Address | | |
| ISO_Contact3 | 30 | Name of the third contact | | |
| ISO_Contact3_Title | 12 | Title of the contact | | |
| ISO_Contact3_Phone | 18 | Phone number | | |
| ISO_Contact3_email | 32 | Email Address | | |

File Name- World Area

| Data Field | Appx Size | Description |
|---|---|---|
| World_Cont_Code | 1 | Code Identifying all the major regions |
| World_Cont_Name | 32 | Name of the Continent or World Area |

File Name- SIC Standard Industry Code

| Data Field | Appx Size | Description |
|---|---|---|
| SIC_Code | 3 | Standard code used by world trade to classify types of businesses |
| SIC_DESC | 32 | Long Description of Industry |
| SIC_DESC_Short | 18 | Short Description of the industry |

TABLE 3-continued

| Data Field | Appx Size | Description | Other File Relationship | Data Element Connecting it |
|---|---|---|---|---|
| | | File Name- ISO Postal City Codes | | |
| Postal_CTRY | 2 | Standard ISO code for the Country | ISO Ctry | ISO_Code |
| Postal_Zone | 16 | Postal Code within the Country | | |
| Postal_City | 25 | Name of the city within the Country | | |
| Postal-Latitude | 10 | Latitude reading of City Center | | |
| Postal-Longitude | 10 | Longitude reading of the City Center | | |
| | | File Name- e2e SKU Seal Products | | |
| SKU_CODE | 12 | Stock Keeping Unit, Model ID, or Product Code of the product | | |
| SKU_DESCR | 80 | Eighty Character Description showing the Characteristics of the model | | |
| SKU_Type | 3 | Product Class type Unit. This will point to another file that will describe these type units. (e.g. Seals, Seals for Ocean Vs Air, Batteries, etc.) | | |
| SKU_MidDescr | 40 | Middle size description for reports | | |
| SKU_Short | 20 | Short Description | | |
| SKU_Patent | 40 | Patent Number Assigned | | |
| | | File Name- e2e Seal Inv ntory | | |
| INV_Owner | 15 | Code for the Party or now Current owner of the seals. | | |
| INV_SKU | 12 | SKU Code | SKU | SKU-CODE |
| INV_Begin_Bal | 9 | Opening balance at beginning of the period. Assumption this will be a month. | | |
| INV_Consumed | 9 | Total units consumed to date within the period used by the Owner | | |
| INV_CURBAL | 9 | Current Balance of Stock | | |
| INV_IN-Transit | 9 | Units being processed | | |
| | | File Name- UN-Load Code - Air/Ocean Port Files | | |
| UNLD-CTRY | 2 | ISO Country Code | ISO | ISO_CODE |
| UNLD-CITY | 3 | Airport/City Code for Intl Port | | |
| UNLD-PortName | 20 | Name of City | | |
| UNLD-Latitude | 10 | Latitude of Port Center | | |
| UNLD-Longitude | 10 | Longitude of Port Center | | |

The preferred embodiment of the e2e system envisions a website that will be the mechanism used by distributors to purchase e2e security seals. Each buyer of the seals should be required to complete the profile information needed to complete the "Party to Transaction" file as shown in Table 3. A fifteen character ID will be assigned to the distributor who can then stipulate their own unique password for entering orders for seals. An distributor may have a limited number of authorized individuals (such as three) who may purchase seals on behalf of the distributor.

Population of the e2e database may take place at a dedicated terminal or from a web interface. FIGS. 3A–3D are examples of interface screens, respectively, to establish a new distributor account, enter an account password, order e2e seals and to establish a new drop-shipment location.

After sale of the seals, booking information is recorded. Table 4 provides the fields in a preferred embodiment of the e2e database for use in recording the booking record. FIG. 4 is an example of a web or terminal interface screen for obtaining the booking information. When a shipment is planned from a supplier/manufacturer to a given consignee there is a booking of the shipment to reserve space on a carrier's vessel, aircraft or truck. It is essential to the e2e system that a booking record be established and associated with a particular seal number before shipment takes place.

TABLE 4

| Field | Logic to be used |
|---|---|
| Seal Number | Must be a valid number on the e2e Seal number file |
| Container Owner | Must be on the SCAC file. |

TABLE 4-continued

| | |
|---|---|
| NOS | Must not be blank |
| Organization ID | Must be on the Party File |
| Carrier ID Code | Must be on the Party File and a type C |
| Origin Ctry | Must be on the ISO file |
| Postal Zone | Must be on the ISO Postal zone file |
| Intermediary Location/Consol | Must be on the Party File |
| Shipper ID | Must be on the Party File |
| Reference | Can be blank |
| Consignee ID | Must be on the Party File |
| Consignee Ref | Can Be Blank |
| Vessel/Airline | Can not be blank |
| Carrier Code | Must be on the Party file or the SCAC file |
| Departs On | Must be shown as CCYYMMDD optionally add time HH:MM |
| Voyage/Flight/ Trip No | Must be given (Plan to validate against Itinerary file of Carriers participating in the SITATS) |
| Origin | Must be given for international Ocean and Air shipments. Must be on UN Load Port file if international movement |
| Destination | Must be given for international Ocean and Air shipments. Must be on UN Load Port file if international movement |

| Data Field | Appx Size | Description | Other File Relationship | Data Element Connecting it |
|---|---|---|---|---|
| File Name SCAC Standard Carrier Alpha Code | | | | |
| SCAC_Country_Code | 2 | International Standards Organization two letter code | | |
| SCAC_Code | 4 | Standard Carrier Alpha Code | | |
| SCAC_Party | 20 | Party Code for SCAC code | Party | Party_CODE |
| SCAC_Shortname | 20 | Move Short name into this field from Party File | | |
| File Name Carrier Driv r ID Code | | | | |
| Driver_SCAC_Country_Code | 2 | International Standards Organization two letter code | | |
| Driver_SCAC_Code | 4 | Standard Carrier Alpha Code | | |
| Driver_ID_State_Prov | 4 | State, Province within Country | | |
| Driver_ID | 20 | Drivers License ID | | |
| Driver_Photo | 50 | File name of image stored as driver's digital picture. | | |

After the booking record has been entered and associated with an e2e security seal, the seal is used to close the container which contains the cargo to be shipped. As discussed above, conventional cargo containers, particularly those used in international shipping have a locking device which is sealed by a lead seal. More specifically, the locking device on many cargo containers is adapted to receive a cable the ends of which are sealed together with lead for the duration of the voyage or until inspected.

Figure 2B:
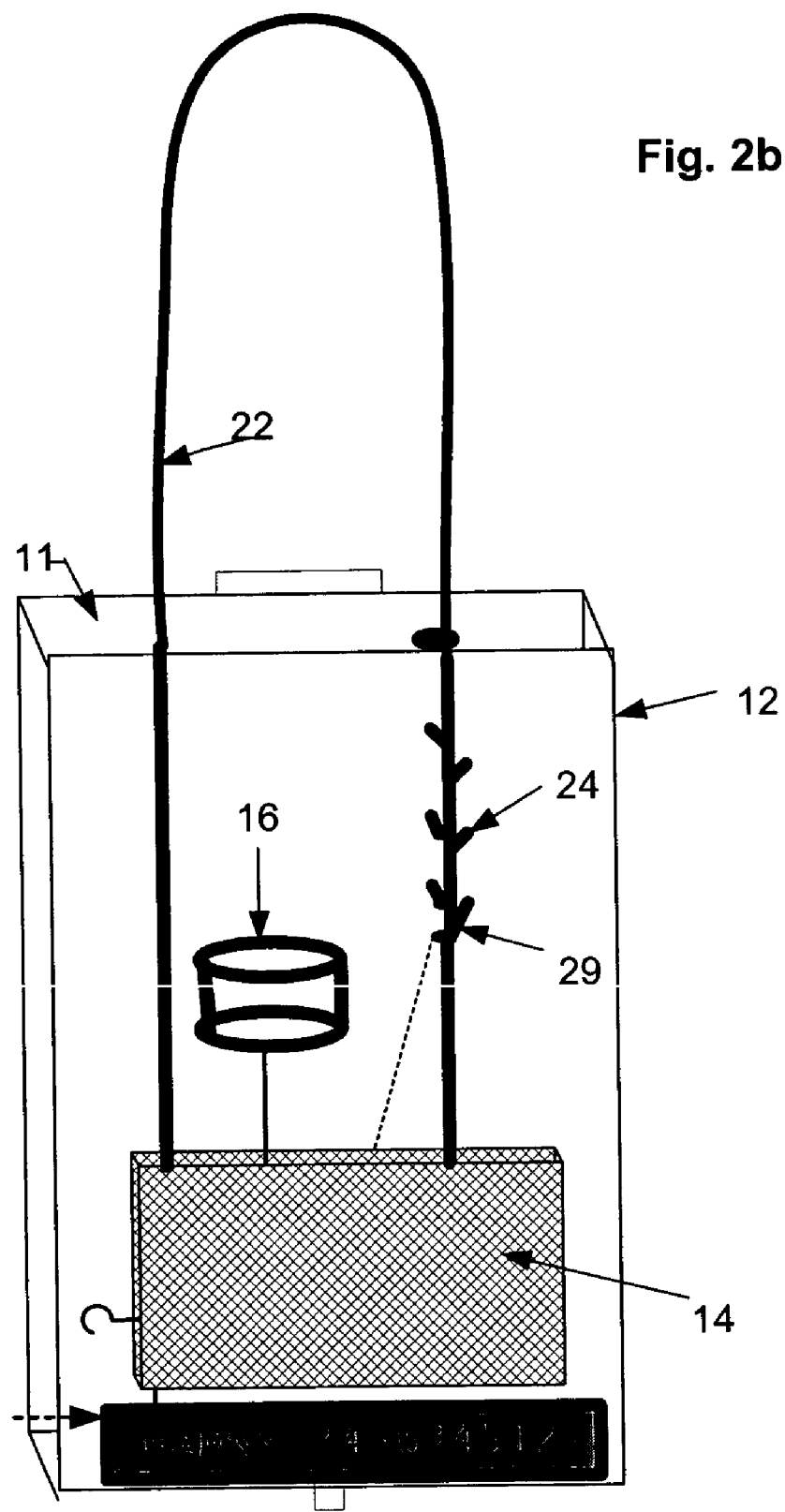
FIG. 2B is a schematic diagram of an e2e security seal that has been locked.
Figure 2C:
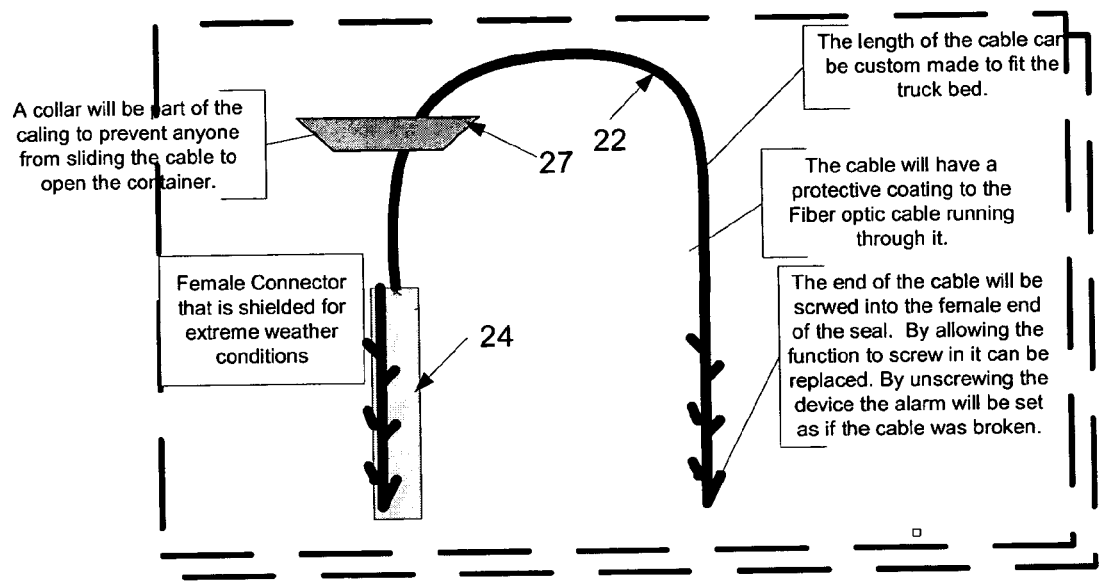
FIG. 2C is a schematic detail of the locking mechanism of an embodiment of the e2e security seal.

Referring to FIGS. 2A–2C, flex cable 22 is threaded through the locking device of a conventional container ULD (unit load device), crate or any suitable shipping device that can be enclosed or secured. This completes a circuit which turns the seal on and cable end 26 is inserted into receptacle end 24. As shown in FIG. 2B, this creates a complete circuit which can automatically be detected by transmitter 14, or can be indicated by the actuation of a pressure sensing switch 29 which detects when flex cable 22 is fully inserted into receptacle 24. Thus, the e2e security seal takes the place of the conventional lead seal currently used in the shipping industry.

Flex cable 22 can be as long as needed to function with containers, such as those with soft sides which need a relatively long cable to tie in the soft sides. Flex cable 22 can be supplemented by an extension cable (having a receptacle-sized end on one side having the same characteristics as receptacle end 24 and having a cable end such as cable end 26 on the other). It is critical that the length of the cable not exceed the ability of transmitter/receiver 14 to detect a complete circuit from flex cable 22 to receptacle end 24 when the seal is closed.

As shown in FIG. 2C, it is preferable that the length of flex cable 22 not permit the opening of the container without cutting flex cable 22 due to excessive slack. One or more collars 27 can be provided on the cable to act as a physical barrier to prevent sliding the cable to open the container without breaking the seal. Additionally, an extension of the flex cable can be run throughout the walls of the container that can detect a break in any of the six walls of the container.

When the seal is closed, the transmitter/receiver becomes active and begins transmitting and receiving data. Battery cell 16 preferably provides for at least 120 days of signal power, however this can be varied to accommodate voyages of greater or lesser duration.

The initial transmission from the closed e2e security seal will indicate that the seal has been employed and is now active. In response, the e2e system will first look for a booking record associated with the identification number of the e2e security seal. The e2e system will then query the seal for its location and compare the location of the seal (which is the presumed location of the shipment) to the origin point as recorded in the booking record. If the location of the cargo is not the same as the origin, a message can be sent by the e2e system, preferably to the owner of the cargo indicating the discrepancy.

If no booking record exists, then the e2e system generates a message indicating that the container can be tracked, but that the system can not reasonably determine if the goods are on course or diverted from their ultimate destination.

The e2e system will also create an expected itinerary file based on the mode of transportation and carriers selected in the booking record. This is known as a routing guide The system will create anticipated "way points" with the coordinates of those points kept as a means to establish any deviations from the anticipated course. As discussed in detail below, these way points are preferably monitored in-transit.

The e2e system also updates its database with respect to the distributor who bought the seal, indicating that the seal has been used, and that the seal has started its journey. This is the start of a tracking record created by the e2e system which can be used to reconstruct every location and dime and date of the cargo on its journey to the destination. This information may be considered useful by logistic analysts to study transit times and trade lane evaluations.

Optionally, a record could be sent to any participating party including any one or all of the shipper, consignee, exporting country officials and international carriers. Transmission records of itinerary movements are preferably standardized and encrypted using encryption criteria developed by the e2e system and provided to those participating on electronic exchange of data as to position. Secure web support for authorized users can also be provided.

The next step in the e2e system process is in-transit tracking of the shipment. The tracking is preferably done in three tiers, the first of which is a map image of the expected route (as calculated based on the booking record) and any diversions from that route. The map image can allow users a number of views of the itinerary map, at least the following ten being preferred:

Global view
Expected itenerary
Detailed map of origin of shipment
High-level map of current cargo location
Mid-level map of current location Detailed map of current location
Specific current location
Detailed map of expected port of entry
Detailed map of destination area
Detailed map of specific destination The second tier is the expected computer generated routing of the shipment based on the booking information given. The routing information could be displayed on the any of the above views in a particular color such as blue. The third tier is the actual route taken at any point in the journey. This route could be displayed in red to distinguish it from the expected route. The views of in-transit tracking could be accomplished using any prior art mapping software or online mapping services such as Expedia (r) by MicroSoft (r) or MapQuest (r) as long as the software has the capability to zoom its view in to specifically locate the cargo. The cargo can then be graphically depicted on the map as a truck, jet or vessel depending upon the mode of transport currently moving the cargo.

A further display is preferably available to the e2e system user providing specific information on location including country, city, latitude, longitude and distance to destination. Further information may include current time, time since cargo departed its origin and time expected at destination. Based on the above information, it is possible to determine the time and extent of deviation from the calculated expected route.

More specifically, the expected route, which forms the basis of the routing guide, is calculated by the e2e system from the information in the booking record. The routing guide provides for a fixed set of coordinates based on latitude and longitude of way points on the expected route. The routing guide therefore provides the e2e system with the sequential coordinates that the cargo is expected to follow to reach its destination.

However, ocean vessels and flights do not always follow a strict route as a vehicle might, and even vehicles require the ability to deviate from a strict route plan so that the normal business of shipping can account for storms, or traffic that are better avoided. Thus, the e2e system should have tolerances built in to allow for a degree of deviation from the expected route.

As shown in FIG. 5, tolerances are typically based on absolute distance from the expected route. Diagram 60 is a graphic depiction of the status assigned to moving cargo based on its location relative to its expected position at any given time during shipment. Each of regions 62, 64, 66 and 68 represents an area defined by a progressively larger distance from the expected position to the north, south, east or west. The exact size of each region can be defined by the e2e system based upon the type of cargo and mode of transportation, or can be defined by a user, such as a shipper or consignee who would prefer to define routing tolerances according to individual or corporate policies.

During transport, the regions 62, 64, 66 and 68 move in unison according to the expected movement of the cargo. The condition of the shipment is defined by the region in which the cargo is found based on the transmissions of the e2e security seal on the cargo at a given time during transportaion. The first condition, defined by region 62, identified as "white" indicates that the cargo is on course and closely corresponds to the routing guide. The second condition, defined by region 64 and identified as "green" indicates a safe deviation for this segment of the trip. As noted above, the deviation tolerance will differ from land, ocean and air movements.

The third condition, defined by region 66 and identified as "yellow" indicates that the deviation is a reason for concern. Upon reaching this condition, a message can be sent by the e2e system to the carrier or to other authorities stating that there is reason for caution. The transmission of the warning to the carrier would allow the carrier to provide a reason for the change in routing, if any. The routing guide could then be updated to reflect the change in plan.

The fourth condition, defined by region 68 and identified as "red" includes all of the area outside yellow region 66 and indicates that a serious problem with the routing of the shipment exists. The red zone ordinarily requires an immediate alert to government authorities and the carrier. At this point, the authorities would be able to take whatever necessary precaution that the nature and location of the goods suggest should be taken to intercept the cargo, which is now off course.

The next step in the e2e system process occurs at the arrival of the cargo at the country of destination. During shipment of the cargo following the activation of the e2e security seal, the e2e system keeps track of the border crossings made by the cargo in its database as a border crossing record. Exemplary data fields in the e2e database for maintaining the border crossing record are shown in Table 5. The objective is to send the border crossing information to destination government authorities such as customs and to customs brokers, shippers and carriers as well as the end consignee. Particularly with respect to customs officials, having a verifiable list of border crossings, and proof that the original e2e seal is still intact, may speed the cargo through customs processing. However, should customs determine that inspection is required, a new e2e seal could be placed on the cargo, the identification number of the new seal being updated in the e2e booking record.

the destination country. It is typical that when cargo is off-loaded at the port of destination it is given to a trucker who will move it to an authorized container or De-Consolidation station or on directly to the designated consignee. The e2e system can provide for the interchange of the cargo with another entity and thereby passing responsibility for the cargo to that entity. This aspect of the e2e system can be fully integrated or can comprise a stand-alone application.

In addition to recording the interchange of the cargo, the reporting of damage to the container and who is responsible can also be established. FIGS. 7A, 7B and 7C are examples

TABLE 5

| Data Field | Appx Size | Description | Other File Relationship | Data Element Connecting it |
|---|---|---|---|---|
| BC_Record | 5 | Record ID code "e2eBC" will ID this as a Border crossing Record | | |
| BC_Carrier_Name | 20 | Name of the Carrier | None | |
| BC_Carrier_Code | 4 | SCAC Code | None | |
| BC-Contr_No | 7 | Container number | None | |
| BC_Shipper | 20 | Government Code for Shipper If not available then e2e Party Code | None | |
| BC_Consignee | 20 | Government Code for Consignee if not available then e2e Party code | None | |
| BC-SealID | 15 | Seal number in the event the party wants to continue tracking using the e2e reference | None | |
| BC-Date Time | 12 | CCYYMMDDHHmm Century, Year, Month, Day, Hour, Minute | None | |
| BC_CITY | 20 | Closet city where crossing Border | None | |

To facilitate customs clearance in international shipments, the clearance process can also be integrated into the e2e system. By allowing authorized customs officials to have direct access to the e2e system, particularly the databases associated with the booking record, the clearance and customs data processes can be combined. FIGS. 6a and 6b are examples of user interfaces which can be used by customs officials to facilitate clearance.

Often there is more than one carrier involved in the movement of cargo from one point to another after arrival in of user interfaces which can be used to populate the e2e database with the information discussed above related to cargo interchange.

The arrival of the cargo in the city of destination is significant because several entities are customarily informed that the cargo is ready for reception at the consignee. Based on whether this is an international shipment, customs, customs brokers, the shipper and the consignee will receive notification of cargo arrival. Table 6 provides the data fields that are ideally entered into the e2e database upon arrival at the city of destination.

TABLE 6

| Data Field | Appx Size | Description | Other File Relationship | Data Element Connecting it |
|---|---|---|---|---|
| AC_Record | 5 | Record ID code "e2eAC" will ID this as a City Arrival Record | | |
| AC_Carrier_Name | 20 | Name of the Carrier | None | |
| AC_Carrier_Code | 4 | SCAC Code | None | |
| AC-Contr_No | 7 | Container number | None | |
| AC_Shipper | 20 | Government Code for Shipper If not available then e2e Party code | None | |
| AC_Consignee | 20 | Government Code for Consignee if not available then e2e Party code | None | |
| AC-SealID | 15 | Seal number in the event the party wants to continue tracking using the e2e reference | None | |

TABLE 6-continued

| Data Field | Appx Size | Description | Other File Relationship | Data Element Connecting it |
|---|---|---|---|---|
| AC-Date Time | 12 | CCYYMMDDHHmm Century, Year, Month, Day, Hour, Minute | None | |
| AC_CITY | 20 | Closet city where arriving city | None | |

The final step in the shipping process is the arrival of the cargo at the consignee. This final step accounts for the safe arrival of the goods at the consignee. Typically, the consignee would have the ability to access the web and go to the e2e security site and enter the receipt information. This information will be considered to be proof of delivery by the delivering carrier.

This information might be shared with the shipper, customs broker, international carrier (based on the responsibility of the international carrier to provide a door-to-door deliver) and the delivering carrier. It is essential that the consignee provide this data just prior to breaking the e2e security seal. The e2e system assumes that the container will be at the latitude and longitude of the destination as prescribed in the booking record at the time the seal is broken. If this is not the case, a warning message is transmitted by the e2e system to the appropriate authorities indicating a possible hijack. If the shipper had inserted a second e2e security seal into the cargo, it would now become active as a homing device for authorities to locate the tampered goods. FIG. 8 is an example of a user interface screen that could be used by the e2e system to obtain confirmation from a consignee of safe arrival of a shipment.

FIGS. 9–17 provide a detailed view of the e2e system as it is integrated into the ordinary course of a shipment. FIGS. 9–17 coordinate with the steps in the overall shipping process provided in FIG. 1, and discussed above.

Figure 1:
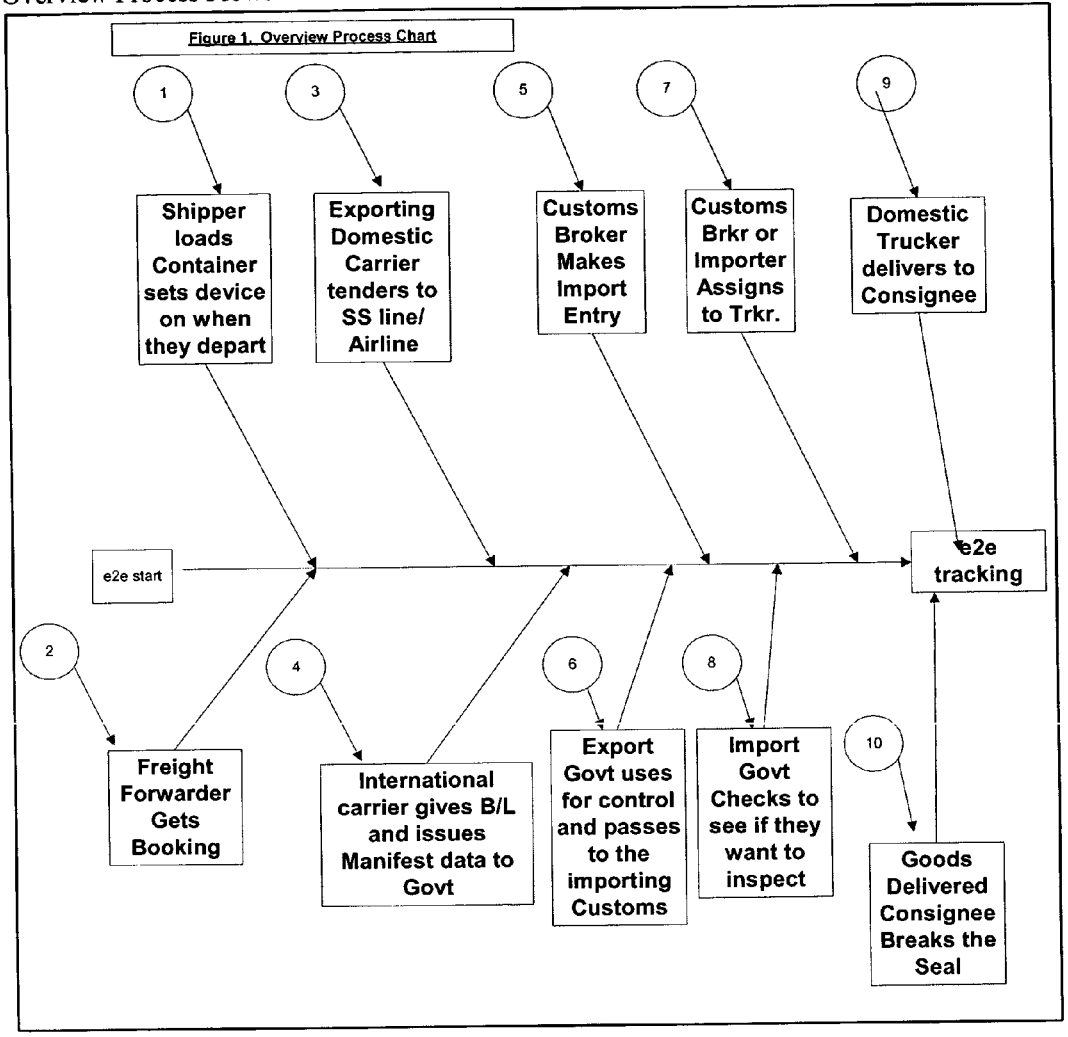
FIG. 1 is a schematic representation of the steps in a typical shipping process as related to the present invention.

In step 1 of FIG. 1, the shipper loads and seals a container. As shown in FIG. 9, this process 100 begins at 102 when a purchase order is received from a buyer or importer. The order is processed at 104 by the order processing department of the shipper. The order is reviewed at 106 after which a work order 108 issues calling for the goods to be readied for shipment.

A copy of the work order 108a is sent to the traffic department and the original is sent to the manufacturing or warehouse floor 110 where the items in the work order are manufactured or picked from stock 112. Meanwhile, traffic copy 108a is forwarded to the traffic manager 114 who may call a forwarder, steam ship line or air line to get a booking. This sets into motion step 2 of FIG. 1.

Referring now to FIG. 10, the call made by traffic manager 114 to a forwarder is received at 116 by telephone, fax or e-mail or by secured Internet 118. The freight forwarder prepares 119 the export document including ocean blading and dock receipts 120 and prescribed export government records which are sent for approval 122. Upon receipt of approval data 124, the approved export notice 126 is provided and then the forwarder arranges for a truck or other transportation to deliver the shipment to an international carrier 128. This process generates a booking number and itinerary which can be transmitted through secure Internet 118 to the shipper.

Referring again to FIG. 9, at 2a, the shipper receives the booking number and itinerary 130 from the forwarder and assigns e2e security seal numbers to be associated with the booking record. The e2e security seal numbers are obtained from one or more e2e security seals 11 which may have been purchased in advance by the shipper. Shipping instructions are then issued to the shipping department 132. The shipper then packs the items for export 134 optionally concealing one or more e2e security seals 11 in the cargo to enable hijack recovery as discussed above. Quality assurance 136 checks the export package and delivers it to the shipping department 138 for storage in container 140.

Shipping enters the seal number 142 over secured Internet 118 to the e2e security tracking computer system 144. When the shipping container is full (146), the e2e security seal 11 is attached and secured to the container and activated 148. The e2e security seal then begins transmitting the seal number via satellite. The e2e system will determine the coordinates and location of the device and match it to the booking record 150.

Referring again to FIG. 10, if required by shipper, the freight forwarder 116a will arrange for the export domestic trucker to pick up container 140. A dock receipt 152 is issued and sent via secured Internet 118 to the exporting domestic carrier in step 3. Similarly, freight forwarder 116 forwards the freight information via secured Internet 118 or directly to a steam ship line or air line 154.

Figure 11:
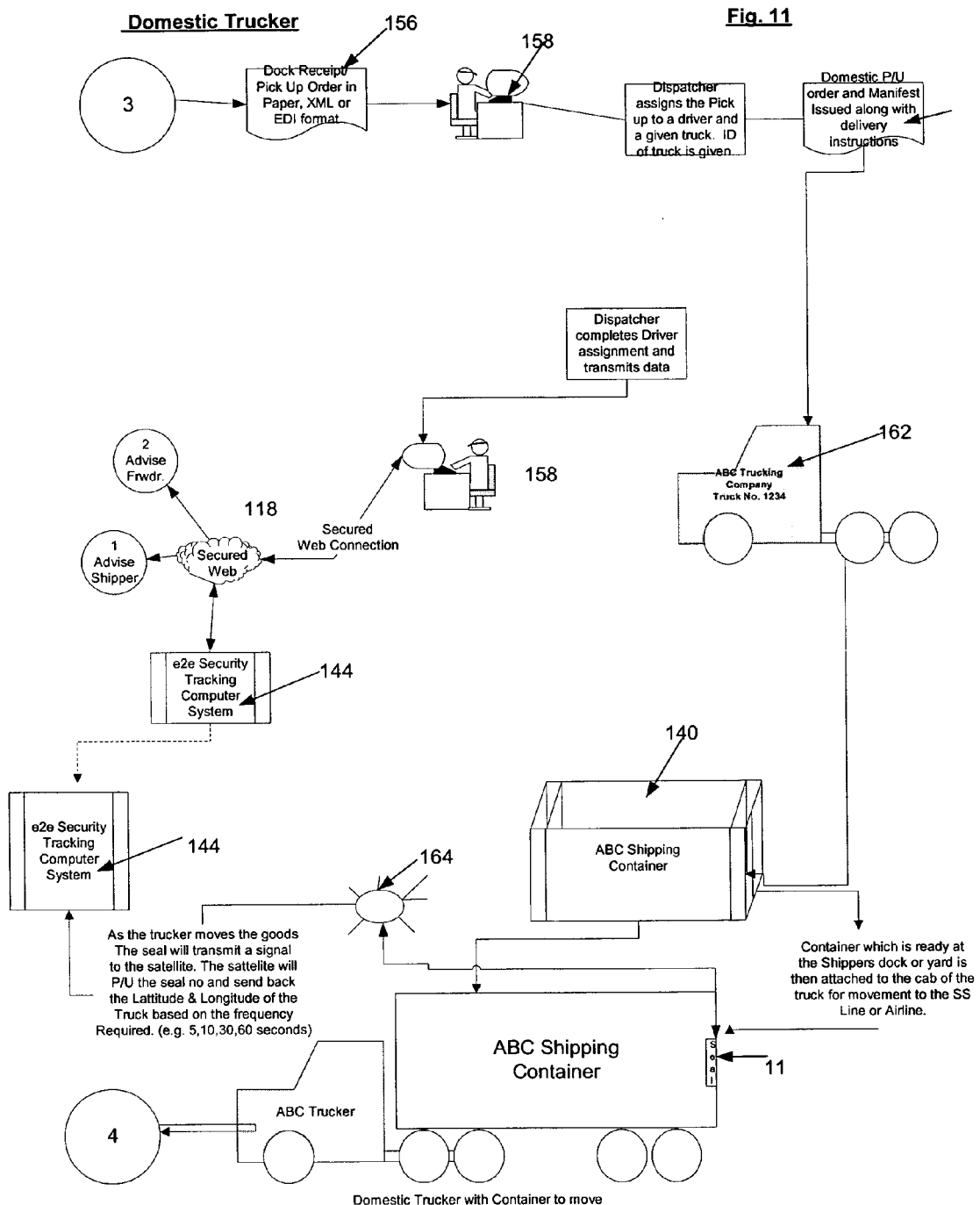
FIG. 11 is a process flow diagram of an exemplary process implemented by a domestic trucker integrating the system of the present invention.

Referring to FIG. 11, domestic trucking company receives dock receipt 156. Dispatcher 158 assigns a specific driver to pick up the shipment. A domestic pick-up order 160 issues with delivery instructions which is provided to ABC Trucking Company 162 with instructions to pick up shipping container 140 which is ready at the shipper's dock or yard and is then attached to the cab of a truck for movement to the steam ship line or air line.

e2e security seal 11 transmits a signal via satellite 164 to the e2e security tracking computer system 144 as the trucker moves the goods. The satellite picks up the seal number and sends back the latitude and longitude of the truck at the required intervals for example, 5, 10, 30 or 60 seconds apart.

After the dispatcher 158a completes the driver assignment the specific truck and drivers' information is forwarded via secure web 118 to the e2e security tracking computer system as well as the shipper 1 and forwarder 2.

Figure 12:
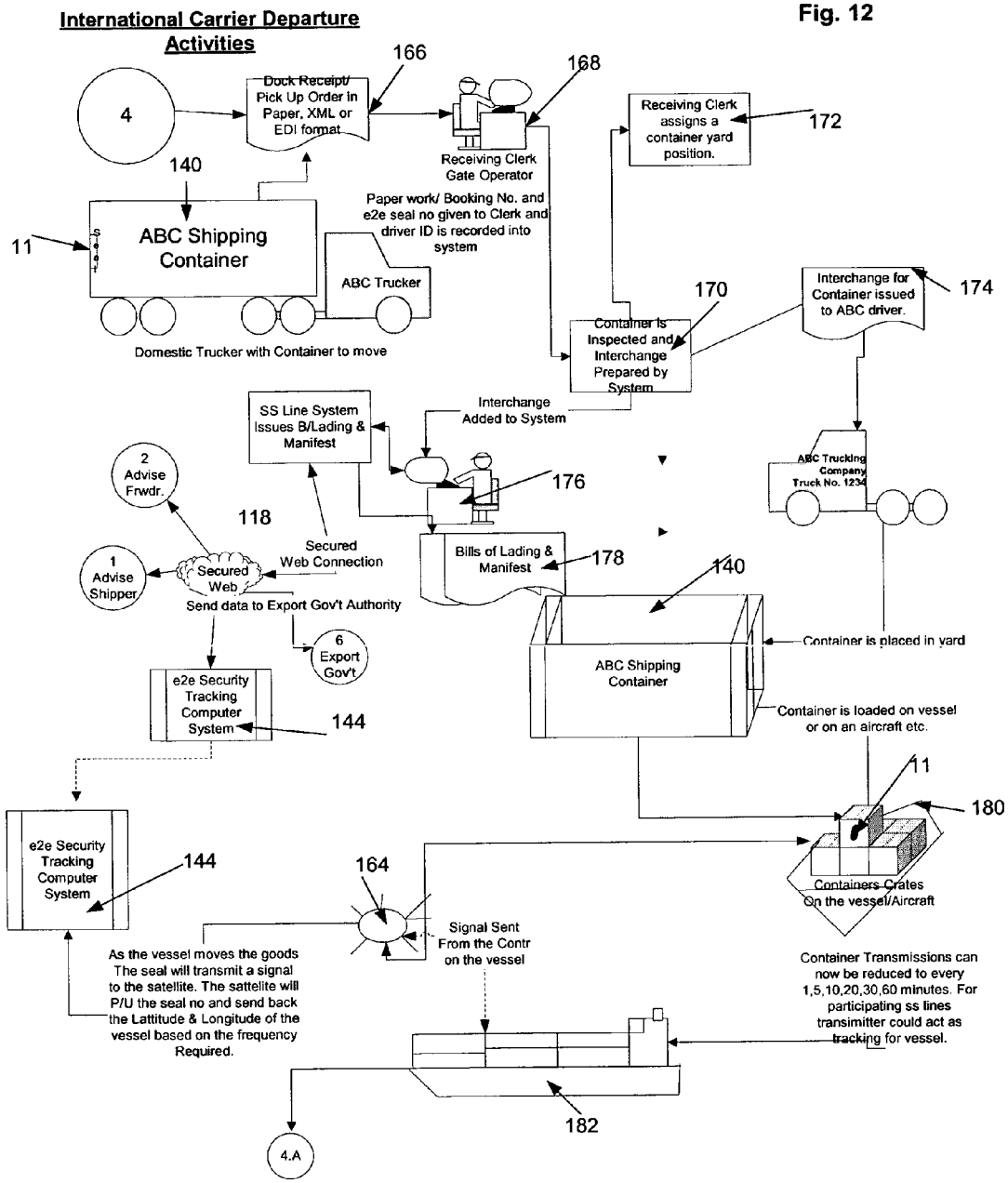
FIG. 12 is a process flow diagram of an exemplary process implemented by an international carrier upon departure implementing the system of the present invention.

Referring to FIG. 12, international carrier departure activity are detailed beginning with step 4 wherein shipping container 140 with e2e security seal 11 has been delivered with dock receipt 166 to the receiving clerk 168. The container is inspected 170 and interchanged to another mode of transportation is prepared. If container is to be held, the receiving clerk 168 also assigns a yard position to the container 172. An interchange order 174 is issued for container 140 and clerk 176 adds the interchange to the carriers computer system. A bill of lading and manifest issues 178 which is forwarded via secured Internet 118 to the shipper 1, freight forwarder 2, export government 6, and the e2e tracking computer system 144.

When the container is loaded on the vessel or on an aircraft 180, signals continue to be sent via satellite 164 to the e2e tracking computer system 144. The vessel 182 is now tracked by the e2e system, although the frequency of transmissions may be reduced, for example, to intervals of every 1, 5, 10, 20, 30 or 60 minutes. On participating steam ship lines, the transmitter in e2e security seal 11 could simultaneously act as a tracking for the vessel itself.

Figure 13:
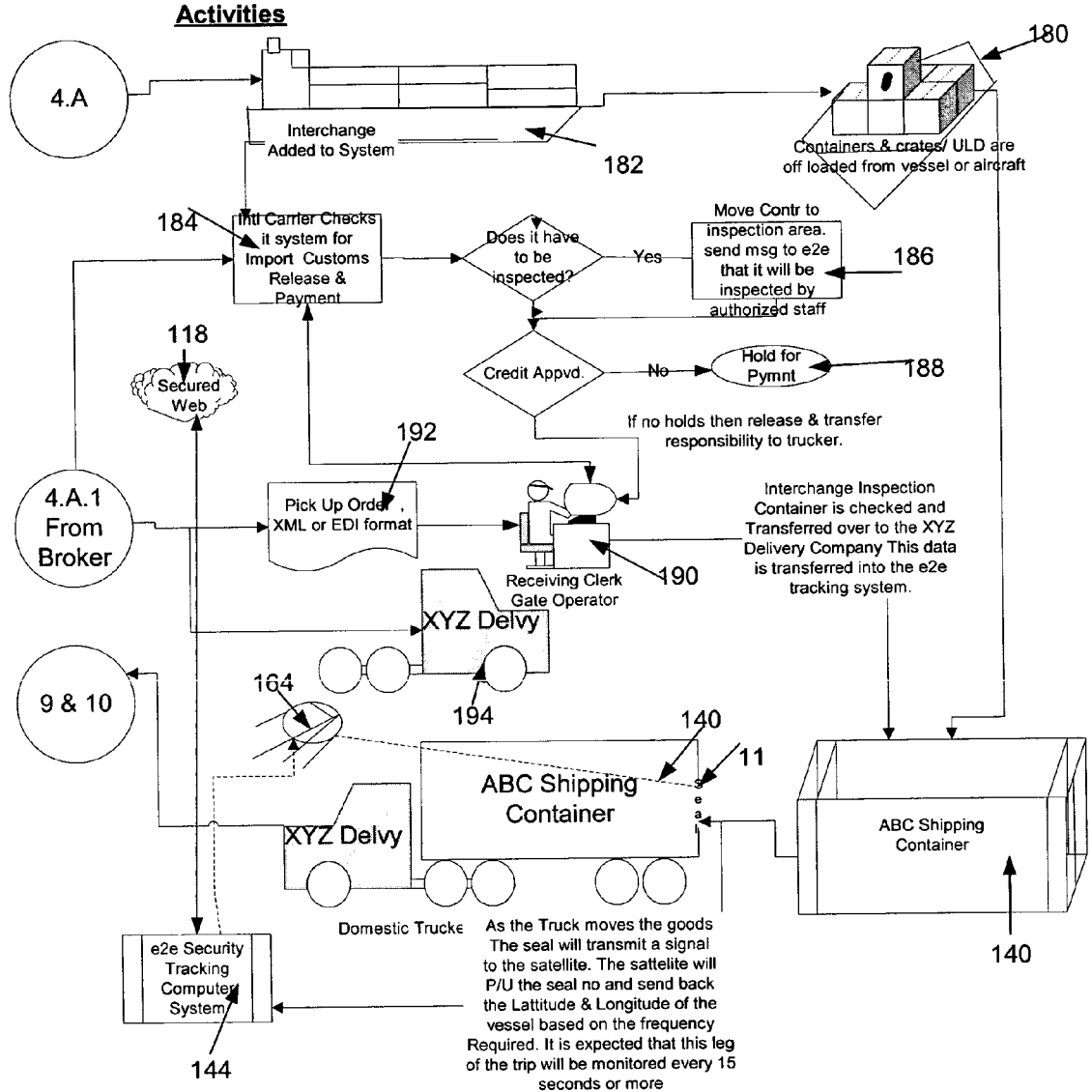
FIG. 13 is a process flow diagram of an exemplary process implemented by an international carrier upon arrival integrating the system of the present invention.

FIG. 13 discloses the international carrier's activities upon arrival at the country of destination. Upon arrival of vessel 182 in port, containers and crates 180 of cargo are offloaded from the vessel or aircraft. Simultaneously, the international carrier undertakes the documentation required for an interchange of cargo, specifically, import customs release and payment 184. Depending on whether the cargo requires inspection, the cargo is moved 186 to an inspection area. A message is simultaneously forwarded to the e2e system indicating that the shipment will be inspected and that the e2e security seal will be broken.

The cargo is held pending payment of outstanding fees 188. When holds are released, receiving clerk 190 receives a pick-up order 192 from an entity associated with customs such as customs broker 4.8.1 and arranges for transfer of the cargo 140 to a domestic delivery company.

e2e security seal 11, which may be the original seal or may be a replacement seal which was placed on container 140 by authorized inspectors following inspection of the cargo upon arrival. As truck 194 moves container 140, seal 11 transmits via satellite 164 data related to the location of container 140 to e2e security tracking computer system 144. Transmission intervals ideally increase in frequency during truck transportation, for example, to intervals of 15 seconds or better.

Figure 14A:
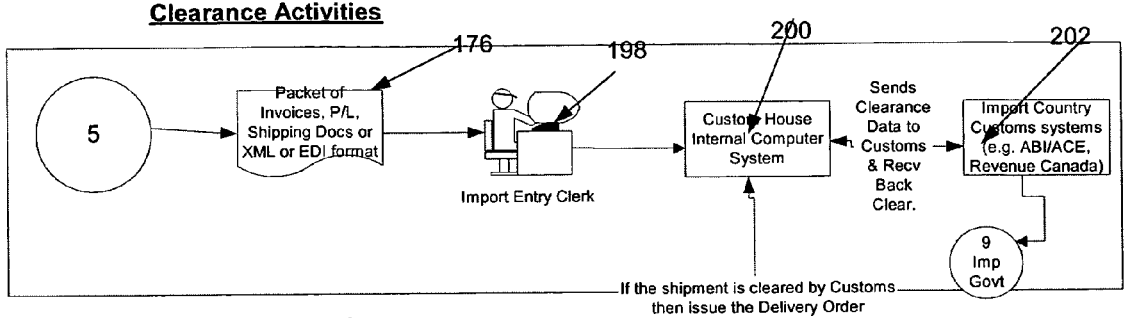
FIGS. 14A and 14B are process flow diagrams of an exemplary process implemented by an import customs broker for import clearance and trucker assignment integrating the system of the present invention.
Figure 14B:
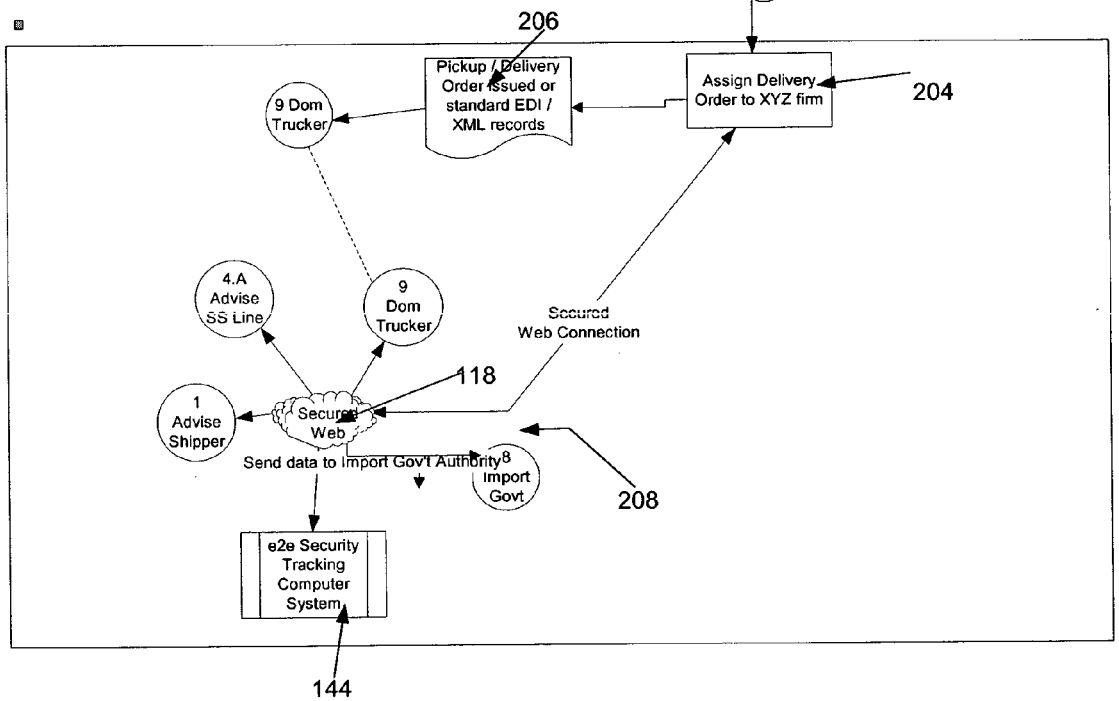

As shown in FIGS. 14 and 14A, the activities of the import customs broker of step 5 begin with the receipt of a packet of invoices and shipping documents 196 which are processed by the import entry clerk 198 and forwarded to domestic customs house internal computer system 200. After receiving clearance from the import country 202, customs house 200 issues a delivery order in step 7 which results in the assignment 204 of delivery to a domestic carrier as shown in FIG. 14A. A pick-up or delivery order is issued 206 which results in the assignment of a domestic trucker according to step 9. As shown in 208, e2e security tracking computer system 144 coordinates the data related to domestic delivery over secured web connection 118 in coordination with the import government authority.

Figure 15:
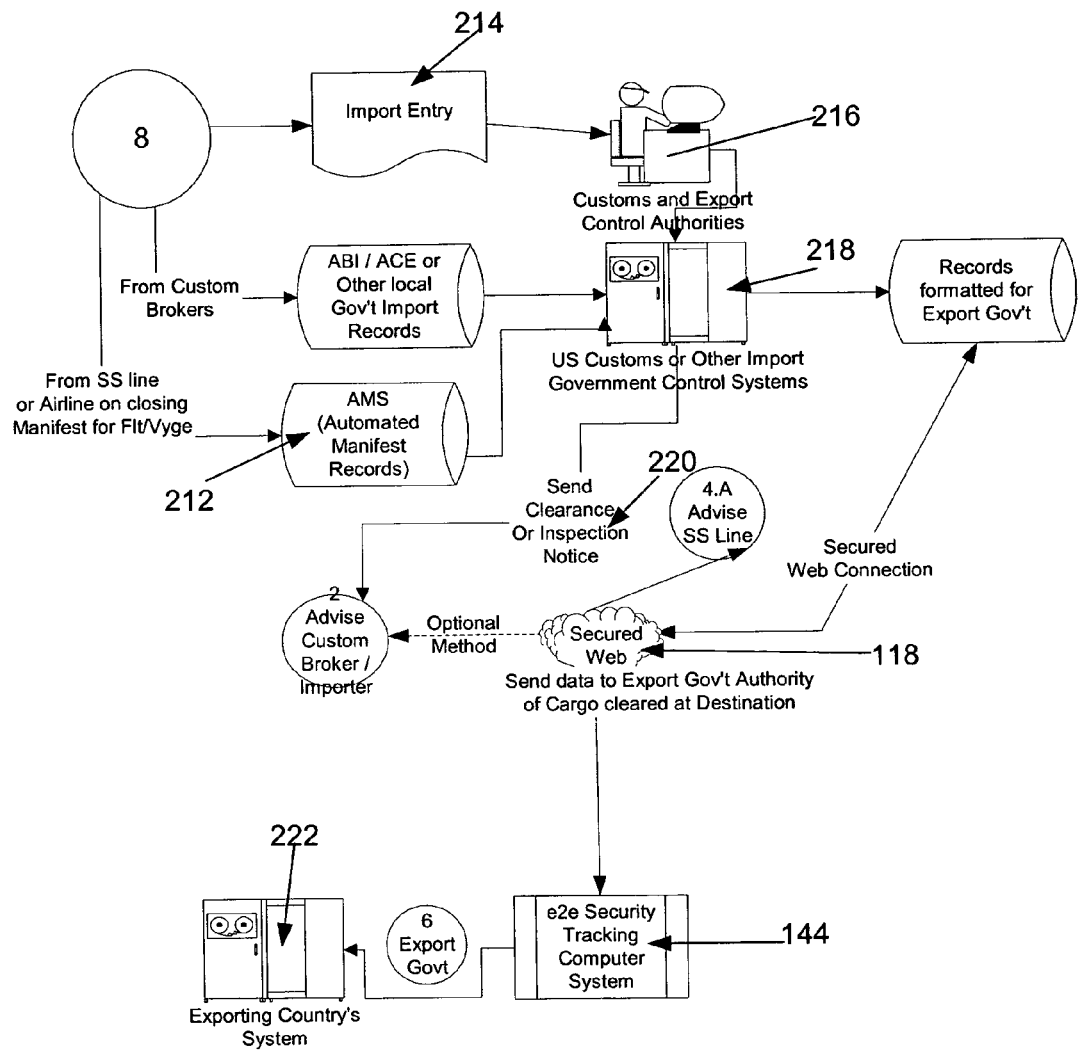
FIG. 15 is a process flow diagram of a process implemented by the importing government of a shipment integrating the system of the present invention.

FIG. 15 details the steps taken by the import government in step 8 in deciding whether to inspect a container of incoming cargo. The information available to the import government typically includes documentation from customs brokers which include ABI or ACE or other local government import records 210 and from steamship or airlines which provide manifest data 212. Upon notice of import entry 214, customs and export control authorities 216 refer to data in customs or other import government control systems 218 in deciding whether to inspect.

Clearance 220 can be sent to customs brokers directly, although the process can be facilitated by the e2e system, as e2e security tracking computer system 144 can provide export government data over secured web connection 118 to import customs control authorities 216 for purposes of assisting in inspection decision making, or expediting clearance.

FIG. 16 discloses the process undertaken by domestic carriers in step 9. While container 140 having e2e security seal 11 affixed thereto is in transit, regular communication via satellite 164 provides e2e computer system 144 with data which permits the e2e system to determine whether the shipment is on course. The domestic dispatcher 224 is responsible for tracking the shipment and uses data from e2e computer system 144 as well as its own computer system 226 to ensure that the shipment is on course, or or provide an explanation in case of deviation. In the event of a deviation, e2e computer system 144 notifies both domestic dispatcher 224 as well as government authorities 228 if the divergence is unexplained.

FIG. 17 illustrates the process of delivery of the cargo at its final destination according to step 10. Shipping container 140 is off-loaded at the consignee's warehouse and seal 11 is broken. Breaking seal 11 initiates the transmission of a signal via satellite 164 to the e2e computer system which verifies that the cargo is physically located at the consignee 230 based on the information in the booking record. If there is a discrepancy and no explanation is provided, government authorities 228 are notified.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for tracking the movement of cargo during shipment from a shipper having a first location defined by a latitude and a longitude to a consignee having a second location differing from said first location and defined by a second latitude and a second longitude said method comprising the steps of:
    a) generating a routing guide stored on a computer system, said routing guide representing an expected path from the first location to the second location, said path being defined by a continuous series of expected locations each defined by an expected latitude, an expected longitude and an expected time;
    b) establishing at least one tolerance level for each of said expected locations defined by a maximum absolute distance from a corresponding expected location, each of said at least one tolerance level associated with a shipment condition;
    c) attaching an electronic seal to said cargo, said electronic seal capable of transmitting an actual location of said cargo to said computer system at a plurality of discrete times;
    d) comparing at one of said plurality of discrete times said actual location to the one of said expected locations having an expected time which corresponds to said one of said plurality of discrete times;
    e) calculating the actual absolute distance of the actual location of the cargo to the expected location of the cargo;
    f) establishing said shipment condition by comparing said actual absolute distance to said maximum absolute distance; and
    g) communicating said condition to at least one of said shipper and said consignee.

2. The method of claim 1 wherein said electronic seal transmits said actual location to said computer system via satellite.

3. The method of claim 1 further comprising the step of creating a booking record associated with said computer system, the booking record containing the origin and destination of said cargo and the identity of carriers and location of interchanges in the cargo, said routing guide being generated based upon the contents of the booking record.

4. A system for monitoring the shipment of cargo from a shipper having a first location defined by a latitude and a longitude to a consignee having a second location differing from said first location and defined by a second latitude and a second longitude, comprising:
 a) a computer system having routing guide associated therewith, said routing guide having a plurality of way points, each of said way points defined by an expected latitude, an expected longitude and a unique time at which the cargo is expected at said way point;
 b) at least one electronic seal attached to said cargo, said seal comprising a means for detecting its current location defined by a latitude and a longitude, a means for detecting the opening of the cargo and a means for periodic two-way wireless communication of data between said seal and said computer system; wherein said computer system periodically receives data from said electronic seal indicating the location of said cargo and wherein said computer system compares said data to said routing guide to determine the condition of said cargo during shipment.

5. The system of claim 4 wherein said data transmitted by said at least one electronic seal includes a signal transmitted to said computer system, initiated by said electronic seal upon closure of said cargo.

6. The system of claim 5 wherein said data transmitted by said at least one electronic seal includes a signal transmitted to said computer system, initiated by said electronic seal upon opening of said cargo.

7. The system of claim 4 further comprising a second electronic seal hidden within said cargo, said second electronic seal having circuitry for receiving data from said at least one electronic seal and means for communication with said computer system, said second electronic seal being activated upon opening of said cargo.

* * * * *